(12) United States Patent
Lavasani

(10) Patent No.: US 9,715,475 B2
(45) Date of Patent: Jul. 25, 2017

(54) SYSTEMS AND METHODS FOR IN-LINE STREAM PROCESSING OF DISTRIBUTED DATAFLOW BASED COMPUTATIONS

(71) Applicant: BigStream Solutions, Inc., Sunnyvale, CA (US)

(72) Inventor: Maysam Lavasani, Cupertino, CA (US)

(73) Assignee: BIGSTREAM SOLUTIONS, INC., Mountain View, CA (US)

(*) Notice: Subject to any disclaimer, the term of this patent is extended or adjusted under 35 U.S.C. 154(b) by 0 days.

(21) Appl. No.: 15/215,374

(22) Filed: Jul. 20, 2016

(65) Prior Publication Data

US 2017/0024352 A1   Jan. 26, 2017

Related U.S. Application Data

(63) Continuation-in-part of application No. 14/885,636, filed on Oct. 16, 2015.
(Continued)

(51) Int. Cl.
*G06F 13/42* (2006.01)
*G06F 13/36* (2006.01)
(Continued)

(52) U.S. Cl.
CPC ........ *G06F 13/4265* (2013.01); *G06F 3/0613* (2013.01); *G06F 3/0659* (2013.01); *G06F 3/0683* (2013.01); *G06F 9/5066* (2013.01); *G06F 9/54* (2013.01); *G06F 13/102* (2013.01); *G06F 13/36* (2013.01)

(58) Field of Classification Search
None
See application file for complete search history.

(56) References Cited

U.S. PATENT DOCUMENTS 8,850,276 B2* 9/2014 Xu .................... H04L 1/0071
                                                    714/701
2007/0011684 A1   1/2007 Du et al.
(Continued)

OTHER PUBLICATIONS

*Notification of transmittal of the international search report and the written opinion of the international searching authority*, for PCT/US2016/043427, mailed Dec. 5, 2016, 24 pages.
(Continued)

*Primary Examiner* — Elias Mamo
(74) *Attorney, Agent, or Firm* — Blakely, Sokoloff, Taylor & Zafman LLP

(57) ABSTRACT

A data processing system is disclosed that includes machines having an in-line accelerator and a general purpose instruction-based general purpose instruction-based processor. In one example, a machine comprises storage to store data and an Input/output (I/O) processing unit coupled to the storage. The I/O processing unit includes an in-line accelerator that is configured for in-line stream processing of distributed multi stage dataflow based computations. For a first stage of operations, the in-line accelerator is configured to read data from the storage, to perform computations on the data, and to shuffle a result of the computations to generate a first set of shuffled data. The in-line accelerator performs the first stage of operations with buffer less computations.

19 Claims, 19 Drawing Sheets

Related U.S. Application Data

(60) Provisional application No. 62/194,885, filed on Jul. 21, 2015.

(51) Int. Cl.
    *G06F 3/06*     (2006.01)
    *G06F 13/10*     (2006.01)
    *G06F 9/50*     (2006.01)
    *G06F 9/54*     (2006.01)

(56) References Cited

U.S. PATENT DOCUMENTS

| | | | |
|---|---|---|---|
| 2007/0286275 A1* | 12/2007 | Kimura | H04N 5/775 375/240.01 |
| 2009/0063831 A1 | 3/2009 | Ekman | |
| 2009/0217266 A1 | 8/2009 | Krishnamurthy et al. | |
| 2010/0189257 A1* | 7/2010 | Bjorkengren | H04L 9/34 380/236 |
| 2013/0254345 A1* | 9/2013 | Kook | H04N 21/23805 709/219 |
| 2013/0254516 A1 | 9/2013 | Ge et al. | |
| 2013/0339649 A1 | 12/2013 | Hsu et al. | |
| 2014/0289445 A1* | 9/2014 | Savich | G06F 17/16 710/317 |
| 2015/0357006 A1* | 12/2015 | Tran | G06F 3/061 711/154 |

OTHER PUBLICATIONS

"Apache Hadoop", Wikipedia, https://en.wikipedia.org/wiki/Apache Hadoop, Feb. 2, 2017, 15 pages.

"Apache Spark", Wikipedia, https://en.wikipedia.org/wiki/Apache Spark, May 31, 2016, 7 pages.

Chung, Eric S., "Linqits: Big Data on Little Clients", *Proc. ISCA*, Jun. 27, 2013, 12 pages.

Francisco, Phil, "The Netezza Data Appliance Architecture: A Platform for High Performance Data Warehousing and Analytics", *IBM*, Jan. 14, 2011, 16 pages.

Lavasani, Maysam, "An FPGA-Based In-Line Accelerator for Memcached", *IEEE Computer Architecture Letters*, vol. 13, No. 2, Jul.-Dec. 2014.

\* cited by examiner

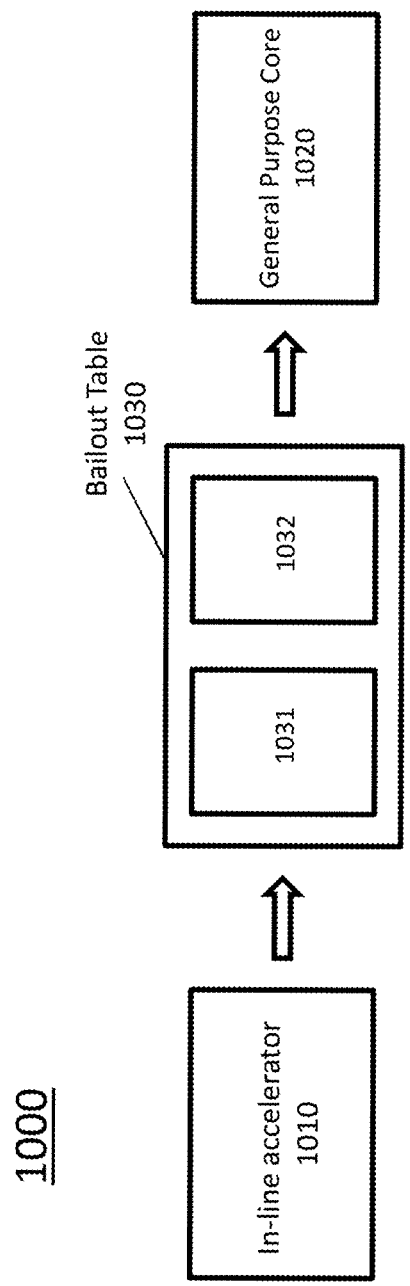

SYSTEMS AND METHODS FOR IN-LINE STREAM PROCESSING OF DISTRIBUTED DATAFLOW BASED COMPUTATIONS

RELATED APPLICATIONS

This application is a continuation-in-part of U.S. Non-Provisional application Ser. No. 14/885,636, filed on Oct. 16, 2015, and claims the benefit of U.S. Provisional Application No. 62/194,885, filed on Jul. 21, 2015, the entire contents of both applications are hereby incorporated by reference.

TECHNICAL FIELD

Embodiments described herein generally relate to the field of data processing, and more particularly relates to methods and systems of automated/controlled data transfer between an auto-generated in-line accelerator and general purpose instruction-based processors.

BACKGROUND

Conventionally, system processing functionalities are written in software for execution in some type of general purpose instruction-based processor to accommodate for future modifications and updates. However, a system functionality executed in software by general purpose instruction-based processor(s) is typically slower than if that same functionality was implemented and executed using accelerators, either as special purpose processors or application specific hardware dedicated to the particular function. Accelerators can increase the performance, decrease the processing latency, and decrease the power consumption of computer systems.

Since accelerators are customized to process only a particular portion of an application, they are often paired with general purpose instruction-based processor(s) in a system to be able to execute the entire application. The part of the application that is compatible with the accelerator is executed by the accelerator. The remaining part is executed by the general purpose instruction-based processor. Traditionally, the accelerator is a slave component for a general purpose instruction-based processor that functions as a master component. The applications run on the general purpose instruction-based processor and for the part of the application that is amenable to acceleration, the general purpose instruction-based processor transfers the control to the accelerator. After finishing the accelerated part of the application, the accelerator returns back the control to the general purpose instruction-based processor.

The conventional acceleration method described above entails a high overhead. First, the input data elements from an input interface must be copied to the general purpose instruction-based processor and then they should be stored in the accelerator. Next, the output data elements (if any) from the accelerator must be copied to the general purpose instruction-based processor and then they should be stored in an output interface. There therefore remains a need for a method and system of implementing an accelerator in conjunction with a general purpose instruction-based processor that overcomes these challenges.

SUMMARY

For one embodiment of the present invention, methods and systems of automated/controlled data transfer between an auto-generated in-line accelerator and general purpose instruction-based processors are disclosed herein. In one embodiment, a machine comprises storage to store data and an Input/output (I/O) processing unit coupled to the storage. The I/O processing unit includes an in-line accelerator that is configured for in-line stream processing of distributed multi stage dataflow based computations. For a first stage of operations, the in-line accelerator is configured to read data from the storage, to perform computations on the data, and to shuffle a result of the computations to generate a first set of shuffled data. The in-line accelerator performs the first stage of operations with buffer less computations.

Other features and advantages of embodiments of the present invention will be apparent from the accompanying drawings and from the detailed description that follows below.

BRIEF DESCRIPTION OF THE DRAWINGS

FIG. 10 illustrates the schematic diagram of implementing a bailout table in accordance with an embodiment of the invention.

DETAILED DESCRIPTION OF EMBODIMENTS

Figure 1:
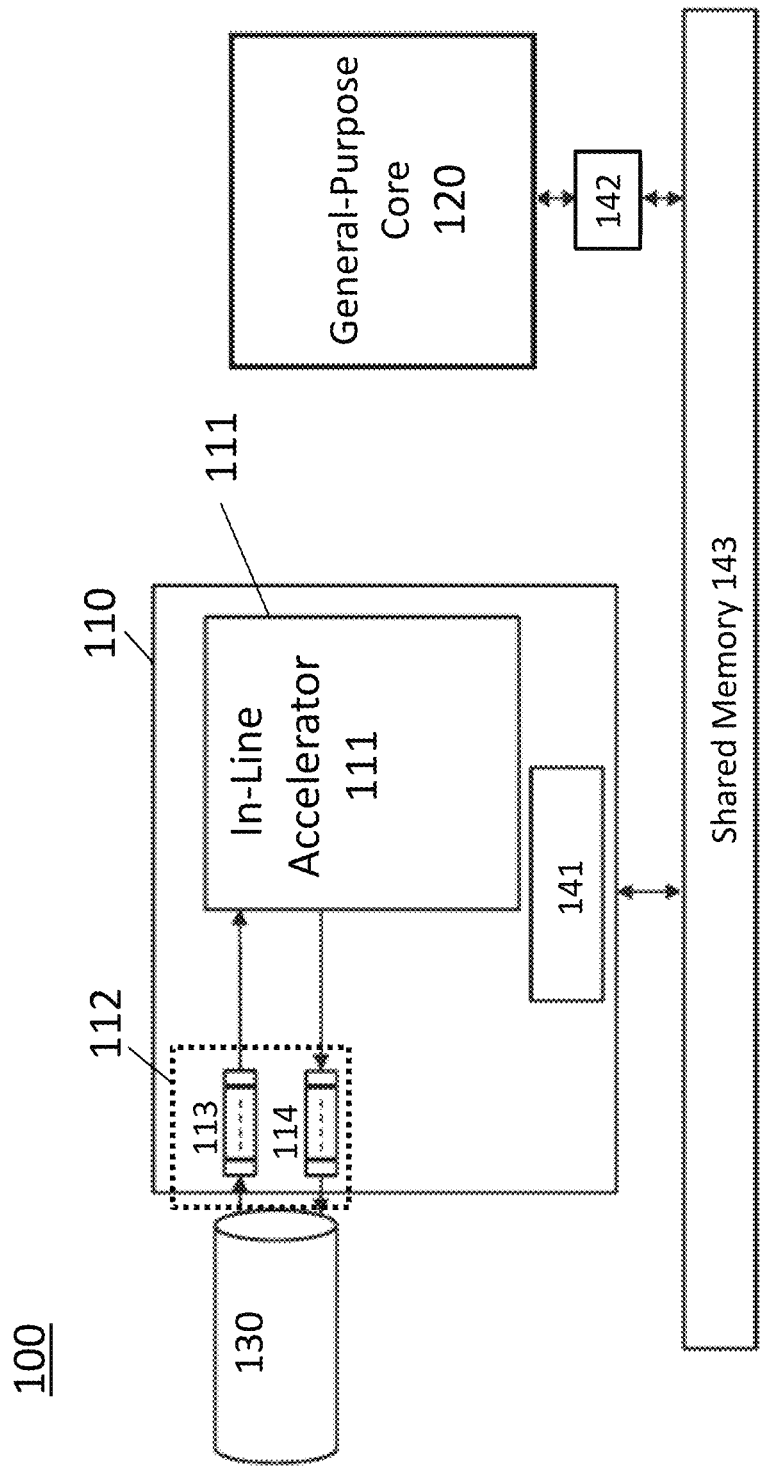
FIG. 1 illustrates the schematic diagram of a data processing system according to an embodiment of the present invention.

Methods, systems and apparatuses for precise, efficient, and transparent transfer of control and data states between an in-line accelerator and a general purpose instruction-based processor are described. An embodiment of invention includes a general purpose instruction-based processor and an in-line accelerator. The input data elements are received by the in-line accelerator. In an embodiment, a compiler may slice the computation associated with processing a data into a fast-path, compiled and/or synthesized into an in-line accelerator, and a slow-path, processed by the general purpose instruction-based processor. In an embodiment, upon premature termination of processing in the fast-path, the execution is automatically transferred to the general purpose instruction-based processor. The transitioning of the computation associated with an input from the in-line accelerator to the general purpose instruction-based processor is referred to as a bailout.

In an embodiment, upon a bailout, the general purpose instruction-based processor (or another acceleration layer in the case of multi-layer in-line acceleration) begins processing the input data elements as if no processing is done by the in-line accelerator. In such an embodiment, the execution of traces on the in-line accelerator is performed speculatively before the bailout. Therefore, the side effects of the computation must be rolled back. In another embodiment, the general purpose instruction-based processor (or the accelerator in the next level in the case of multi-layer in-line acceleration) continues the processing of the in-line accelerator from the bailout point. In such an embodiment, the side effects of the computation by the in-line accelerator are accessible by the general purpose instruction-based processor (or the accelerator in the next level in the multi-level in-line acceleration scenario).

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

HW: Hardware.
SW: Software.
I/O: Input/Output.
DMA: Direct Memory Access.
CPU: CentralProcessingUnit.
FPGA: Field Programmable Gate Arrays.
CGRA: Coarse-Grain Reconfigurable Accelerators.
GPGPU: General-Purpose Graphical Processing Units.
MLWC: ManyLight-weightCores.
ASIC: Application Specific Integrated Circuit.
PCIe: Peripheral Component Interconnect express.
CDFG: Control and Data-Flow Graph.
FIFO: First In, First Out
NIC: Network Interface Card
HLS: High-Level Synthesis
KPN: Kahn Processing Networks
Dataflow analysis: An analysis performed by a compiler on the CDFG of the program to determine dependencies between a write operation on a variable and the consequent operations which might be dependent on the written operation.
Accelerator: a specialized HW/SW component that is customized to run an application or a class of applications efficiently.
In-line accelerator: An accelerator for I/O-intensive applications that can send and receive data without CPU involvement. If an in-line accelerator cannot finish the processing of an input data, it passes the data to the CPU for further processing.
Bailout: The process of transitioning the computation associated with an input from an in-line accelerator to a general purpose instruction-based processor (i.e. general purpose core).
Continuation: A kind of bailout that causes the CPU to continue the execution of an input data on an accelerator right after the bailout point.
Rollback: A kind of bailout that causes the CPU to restart the execution of an input data on an accelerator from the beginning.
Gorilla++: A programming model and language with both dataflow and shared-memory constructs as well as a toolset that generates HW/SW from a Gorilla++ description.
GDF: Gorilla dataflow (the execution model of Gorilla++).
GDF node: A building block of a GDF design that receives an input, may apply a computation kernel on the input, and generates corresponding outputs. A GDF design consists of multiple GDF nodes. A GDF node may be realized as a hardware module or a software thread or a hybrid component. Multiple nodes may be realized on the same virtualized hardware module or on a same virtualized software thread.
Engine: A special kind of component such as GDF that contains computation.
Infrastructure component: Memory, synchronization, and communication components.
Computation kernel: The computation that is applied to all input data elements in an engine.
Data state: A set of memory elements that contains the current state of computation in a Gorilla program.
Control State: A pointer to the current state in a state machine, stage in a pipeline, or instruction in a program associated to an engine.

Dataflow token: Components input/output data elements.

Kernel operation: An atomic unit of computation in a kernel. There might not be a one to one mapping between kernel operations and the corresponding realizations as states in a state machine, stages in a pipeline, or instructions running on a general purpose instruction-based processor.

FIG. 1 illustrates the schematic diagram of data processing system 100 according to an embodiment of the present invention. Data processing system 100 includes I/O processing unit 110 and general purpose instruction-based processor 120. In an embodiment, general purpose instruction-based processor 120 may include a general purpose core or multiple general purpose cores. A general purpose core is not tied to or integrated with any particular algorithm. In an alternative embodiment, general purpose instruction-based processor 120 may be a specialized core. I/O processing unit 110 may include in-line accelerator 111. In-line accelerators are a special class of accelerators that may be used for I/O intensive applications. In-line accelerator 111 and general purpose instruction-based processor may or may not be on a same chip. In-line accelerator 111 is coupled to I/O interface 112. Considering the type of input interface or input data, in one embodiment, the in-line accelerator 111 may receive any type of network packets from a network 130 and an input network interface card (NIC). In another embodiment, the accelerator maybe receiving raw images or videos from the input cameras. In an embodiment, in-line accelerator 111 may also receive voice data from an input voice sensor device.

In an embodiment, in-line accelerator 111 is coupled to multiple I/O interfaces (not shown in the figure). In an embodiment, input data elements are received by I/O interface 112 and the corresponding output data elements generated as the result of the system computation are sent out by I/O interface 112. In an embodiment, I/O data elements are directly passed to/from in-line accelerator 111. In processing the input data elements, in an embodiment, in-line accelerator 111 may be required to transfer the control to general purpose instruction-based processor 120. In an alternative embodiment, in-line accelerator 111 completes execution without transferring the control to general purpose instruction-based processor 120. In an embodiment, in-line accelerator 111 has a master role and general purpose instruction-based processor 120 has a slave role.

In an embodiment, in-line accelerator 111 partially performs the computation associated with the input data elements and transfers the control to other accelerators or the main general purpose instruction-based processor in the system to complete the processing. The term "computation" as used herein may refer to any computer task processing including, but not limited to, any of arithmetic/logic operations, memory operations, I/O operations, and offloading part of the computation to other elements of the system such as general purpose instruction-based processors and accelerators. In-line accelerator 111 may transfer the control to general purpose instruction-based processor 120 to complete the computation. In an alternative embodiment, in-line accelerator 111 performs the computation completely and passes the output data elements to I/O interface 112. In another embodiment, in-line accelerator 111 does not perform any computation on the input data elements and only passes the data to general purpose instruction-based processor 120 for computation. In another embodiment, general purpose instruction-based processor 120 may have in-line accelerator 111 to take control and completes the computation before sending the output data elements to the I/O interface 112.

In an embodiment, in-line accelerator 111 may be implemented using any device known to be used as accelerator, including but not limited to field-programmable gate array (FPGA), Coarse-Grained Reconfigurable Architecture (CGRA), general-purpose computing on graphics processing unit (GPGPU), many light-weight cores (MLWC), network general purpose instruction-based processor, I/O general purpose instruction-based processor, and application-specific integrated circuit (ASIC). In an embodiment, I/O interface 112 may provide connectivity to other interfaces that may be used in networks, storages, cameras, or other user interface devices. I/O interface 112 may include receive first in first out (FIFO) storage 113 and transmit FIFO storage 114. FIFO storages 113 and 114 may be implemented using SRAM, flip-flops, latches or any other suitable form of storage. The input packets are fed to the in-line accelerator through receive FIFO storage 113 and the generated packets are sent over the network by the in-line accelerator and/or general purpose instruction-based processor through transmit FIFO storage 114.

In an embodiment, I/O processing unit 110 may be Network Interface Card (NIC). In an embodiment of the invention, in-line accelerator 111 is part of the NIC. In an embodiment, the NIC is on the same chip as general purpose instruction-based processor 120. In an alternative embodiment, the NIC 110 is on a separate chip coupled to general purpose instruction-based processor 120. In an embodiment, the NIC-based in-line accelerator receives an incoming packet, as input data elements through I/O interface 112, processes the packet and generates the response packet(s) without involving general purpose instruction-based processor 120. Only when in-line accelerator 112 cannot handle the input packet by itself, the packet is transferred to general purpose instruction-based processor 120. In an embodiment, in-line accelerator 112 communicates with other I/O interfaces, for example, storage elements through direct memory access (DMA) to retrieve data without involving general purpose instruction-based processor 120.

In-line accelerator 111 and the general purpose instruction-based processor 120 are coupled to shared memory 143 through private cache memories 141 and 142 respectively. In an embodiment, shared memory 143 is a coherent memory system. The coherent memory system may be implemented as shared cache. In an embodiment, the coherent memory system is implemented using multiples caches with coherency protocol in front of a higher capacity memory such as a DRAM.

Processing data by forming two paths of computations on in-line accelerators and general purpose instruction-based processors (or multiple paths of computation when there are multiple acceleration layers) have many other applications apart from low-level network applications. For example, most emerging big-data applications in data centers have been moving toward scale-out architectures, a technology for scaling the processing power, memory capacity and bandwidth, as well as persistent storage capacity and bandwidth. These scale-out architectures are highly network-intensive. Therefore, they can benefit from in-line acceleration. These applications, however, have a dynamic nature requiring frequent changes and modifications. Therefore, it is highly beneficial to automate the process of splitting an application into a fast-path that can be executed by an in-line accelerator and a slow-path that can be executed by a general purpose instruction-based processor as disclosed herein.

While embodiments of the invention are shown as two accelerated and general-purpose layers throughout this document, it is appreciated by one skilled in the art that the invention can be implemented to include multiple layers of in-line computation with different levels of acceleration and generality. For example, an in-line FPGA accelerator can backed by an in-line many-core hardware. In an embodiment, the in-line many-core hardware can be backed by a general purpose instruction-based processor.

Figure 2:
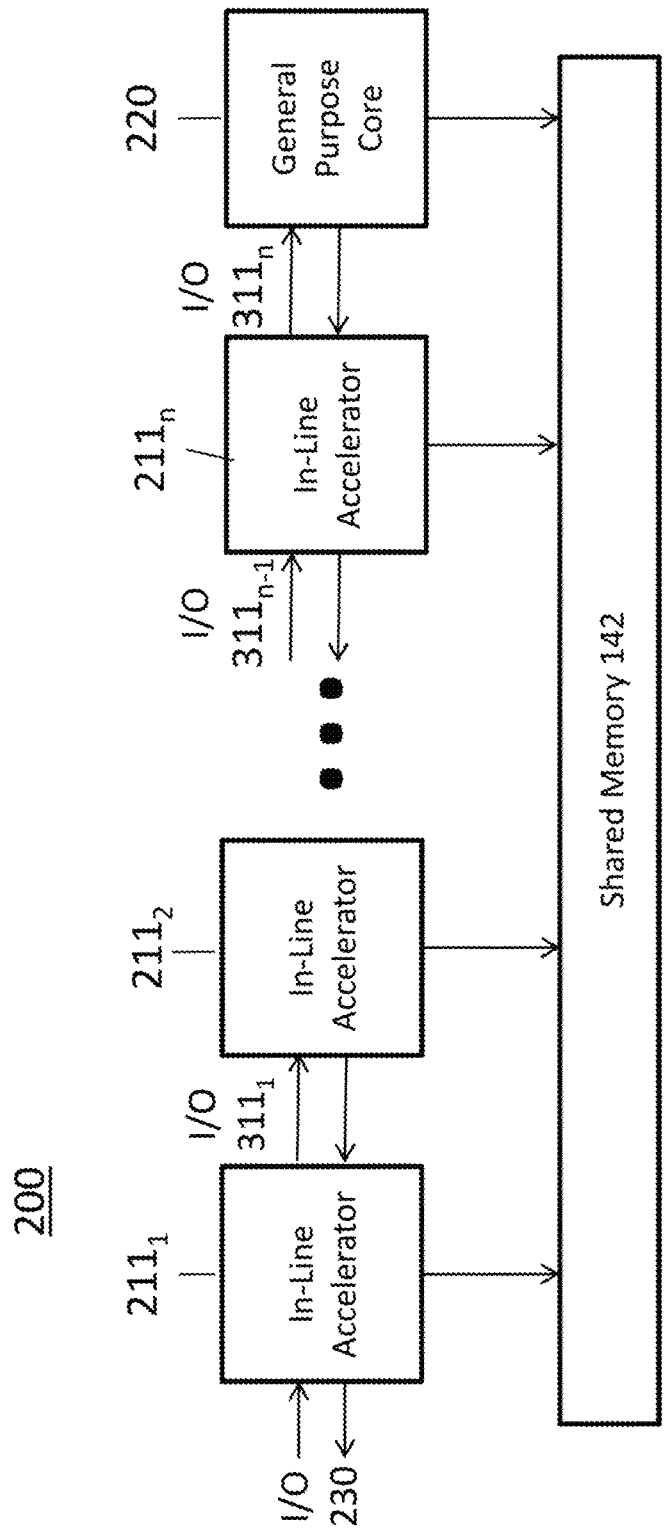
FIG. 2 illustrates the schematic diagram of a multi-layer in-line accelerator according to an embodiment of the invention.

Referring to FIG. 2, in an embodiment of invention, a multi-layer system 200 is formed by a first in-line accelerator $211_1$ and several other in-line accelerators $211_{2-n}$. The multi-layer system 200 includes several accelerators, each performing a particular level of acceleration. In such a system, execution may begin at a first layer by the first in-line accelerator $211_1$. Then, each subsequent layer of acceleration is invoked when the execution exits the layer before it. For example, if the in-line accelerator $211_1$ cannot finish the processing of the input data, the input data and the execution will be transferred to the next acceleration layer, in-line accelerator $211_2$. In an embodiment, the transfer of data between different layers of accelerations may be done through dedicated channels between layers ($311_1$ to $311_n$). In an embodiment, when the execution exits the last acceleration layer by in-line accelerator $211_n$, the control will be transferred to the general-purpose core 220.

Figure 3A:
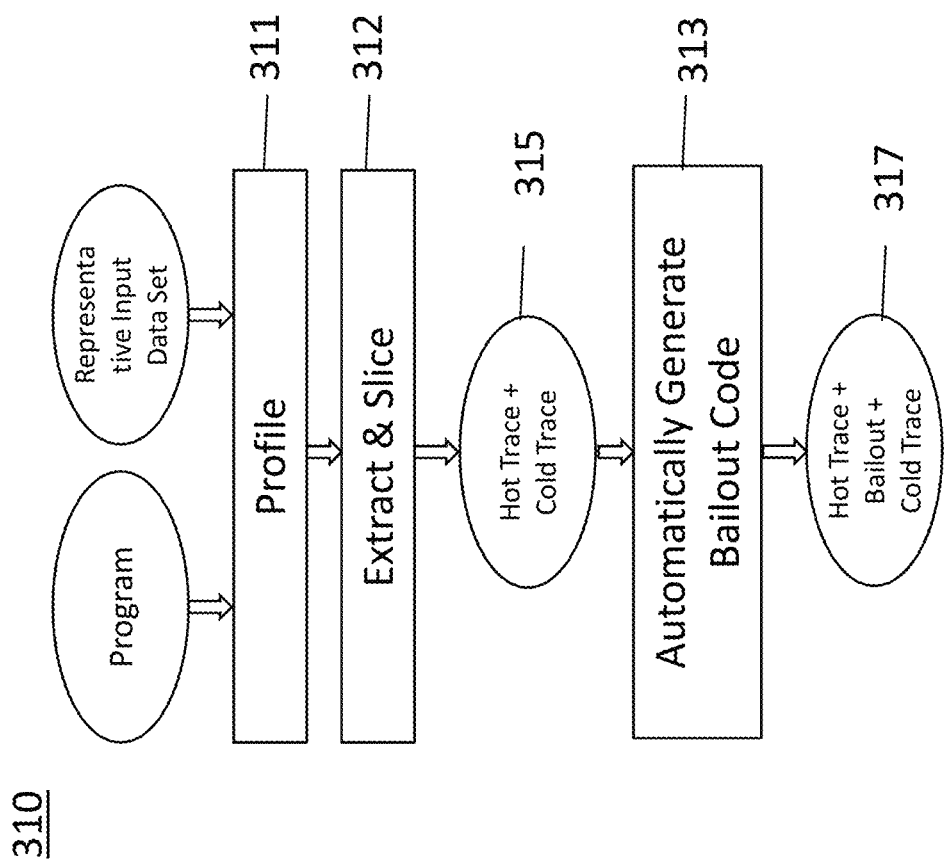
FIG. 3A is a flow diagram illustrating a method flowchart for system performance during compilation time according to an embodiment of the invention.
Figure 3B:
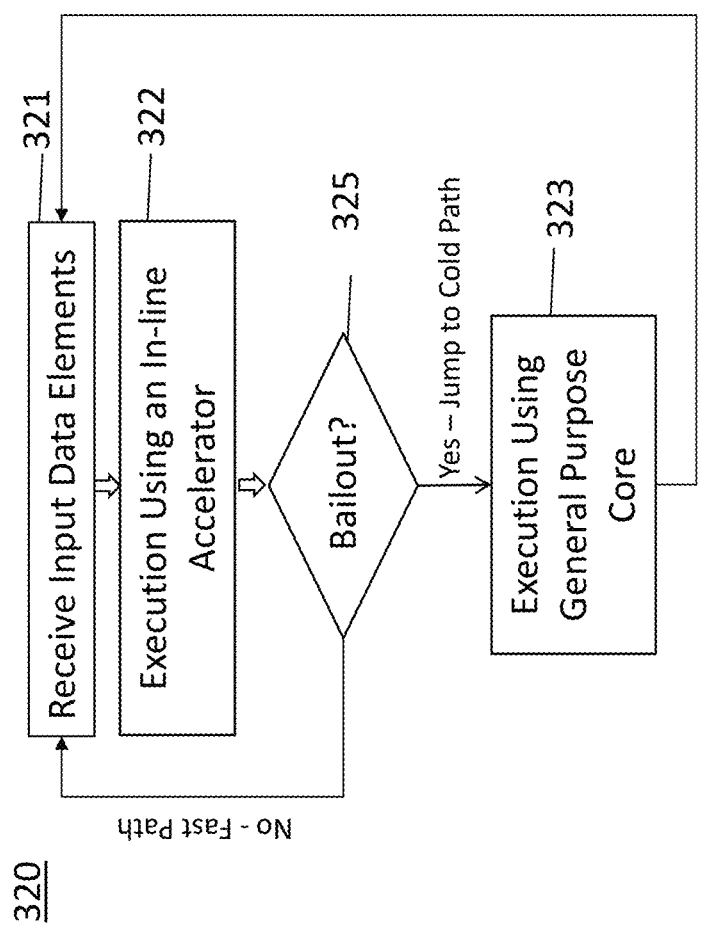
FIG. 3B is a flow diagram illustrating a method flowchart for system performance during runtime according to an embodiment of the invention.

FIG. 3A is flow diagram illustrating a method flowchart for automatic generation of an in-line accelerator by synthesis to hardware model and/or compilation to software for a particular input program during the compilation. FIG. 3B is flow diagram illustrating a method flowchart for implementing the in-line accelerator in the runtime. Although the blocks in the flowcharts with reference to FIGS. 3A and 3B are shown in a particular order, the order of the actions can be modified. Thus, the illustrated embodiments can be performed in a different order, and some actions/blocks may be performed in parallel. Some of the blocks and/or operations listed in FIGS. 3A and 3B are optional in accordance with certain embodiments. The numbering of the blocks presented is for the sake of clarity and is not intended to prescribe an order of operations in which the various blocks must occur. Additionally, operations from the various flows may be utilized in a variety of combinations.

In the first step of compilation, at stage 311 of FIG. 3A, the input program is profiled. Profiling is done by feeding a representative input data to the program, e.g. a set of input requests to a server or a set of input images to an image processing application. In an embodiment, the profiling is performed to identify the fast-path, the trace of highly-executed kernel operations (e.g., basic blocks of the program control and data flow graph (CDFG)). Since the fast-path executes highly used kernel operations, it would be beneficial to implement them by an in-line accelerator. In an embodiment, the profiling may be done based on the data access cost as explained in more details below.

Referring to FIG. 3A, at stage 312 the program is sliced into a fast path and a slow path based on the result of the profiling step 311. In an embodiment, input data elements are received by the server for processing. The program on the server reads the input data element and apply the computation kernel on them. Each computation kernel may have a CDFG which is graph describing the flow of control and flow of the data in the program. At stage 312, the CDFG is sliced to extract subgraphs that are most frequently used. In case of multi-layer system, the CDFG may be sliced to different levels of frequency. Fully connected subgraphs are referred to as a trace. In an embodiment, the traces of highly-executed basic blocks are extracted to form the hot traces and the remaining traces are cold traces at stage 315.

In an embodiment, a fast path may be formed to execute hot traces by an in-line accelerator. In an embodiment, when an input data enters the in-line accelerator, in-line accelerator can process data as long as the execution trace remains in the fast path trace. If the execution trace exits the fast-path, the accelerator cannot process the input data anymore. As such, at stage 313, a bailout code is automatically generated upon the termination of hot trace to transfer execution from the in-line accelerator to a general-purpose core (slow path). In an embodiment, bailout code facilitates transitioning between the fast path implemented by an in-line accelerator to the slow path implemented by a general purpose instruction-based processor.

In a multi-layer acceleration, there may be multiple fast path traces each for various execution frequencies observed during profiling. In an embodiment, the first in-line accelerator will run the trace of operations with maximum execution frequency. Upon bailout the execution may be transferred to the next in-line accelerator, which runs the trace of operations with a lower execution frequency and so on. Eventually the general purpose instruction-based processor runs the non-accelerated application.

In an embodiment of the invention, a hardwired in-line accelerator can be generated for the extracted fast-path by running the fast-path part of the application plus bailout mechanism through an HLS (High-Level Synthesis) tool. In an embodiment, the hardwired accelerator is implemented on an FPGA or an ASIC substrate. A programmable in-line accelerator, e.g. a network general purpose instruction-based processor or a CGRA, can be programmed by compiling the fast-path plus bailout mechanism into the corresponding micro-codes or instructions. This automation makes the acceleration process transparent and amenable to any arbitrary application. Similar mechanisms can be used to generate accelerators for different acceleration level in a multi-layer in-line acceleration system. Hot trace, bailout, and cold trace occur at stage 317.

FIG. 3B is flow diagram illustrating a method flowchart for implementing the in-line accelerator in the runtime. During the runtime, at stage 321, the in-line accelerator receives the input data elements. In an embodiment, the incoming packets as input data elements are directly communicated to an in-line accelerator through an I/O interface. At stage 322, the in-line accelerator starts processing the input data elements. In an embodiment, the input data elements may be entirely processed by the in-line accelerator. In other embodiment, the execution of hot traces may finish prematurely on the in-line accelerator (bailout). A determination of a bailout occurs at stage 325. Upon occurrence of a bailout, the bailout code is executed to transfer control and data operation between the in-line accelerator and the general purpose instruction-based processor (or the accelerator in the next level in the case of multi-layer in-line acceleration scenario). The implementation of bailouts is discussed in further details below.

In an embodiment, no bailout occurs in executing the input data elements and the execution remains entirely in the fast path. In an alternative embodiment, the in-line accelerator fails to complete computation on input data elements. As such, the in-line accelerator will send the data state to a general purpose instruction-based processor (or the accelerator in the next level in a multi-level in-line acceleration scenario). A data state is a set of memory elements that contains the current operation of computation. Subsequently, at stage 323 the general purpose instruction-based processor executes operations associated with processing the input data elements.

Referring to FIG. 3B, if the application requires generating a response, a response is generated by the general purpose instruction-based processor at stage 324. In an embodiment, the in-line accelerator generates response packets without involving the general purpose instruction-based processor. In an embodiment, the execution is first transferred from the in-line accelerator to the general purpose instruction-based processor and the response packets are generated by the general purpose instruction-based processor.

Any data parallel execution model including high-level dataflow execution models such as MapReduce, Dryad, and Spark may be used to design the data processing system in accordance with the disclosed invention. Embodiments of the invention can also be extended to sequential languages such as C/C++ either by considering the sequential code as a single (probably big) dataflow node or by converting the sequential program to the parallel programming language to achieve better performance. For purposes of providing an example only and without limiting the structure, function, purposes and use of embodiment of the invention, an exemplary implementation of the invention is explained in the context of Gorilla++ programming model.

Gorilla++ is an example of parallel programming language and a toolset for designing high performance streaming accelerators including networking and big-data applications. Gorilla DataFlow (GDF) is the execution model that Gorilla++ is built upon. GDF plays an essential role in the Gorilla++ toolset. GDF is designed based on three major goals: (i) generality to cover a wide range of applications, (ii) expressiveness to facilitate the modeling of the target applications, and (iii) analyzability to improve the quality of the results of Gorilla++ compiler. An important feature of GDF model that improves both programmability and analyzability of the model is using structured composition of the connectivity and interfaces of the nodes.

Figure 4:
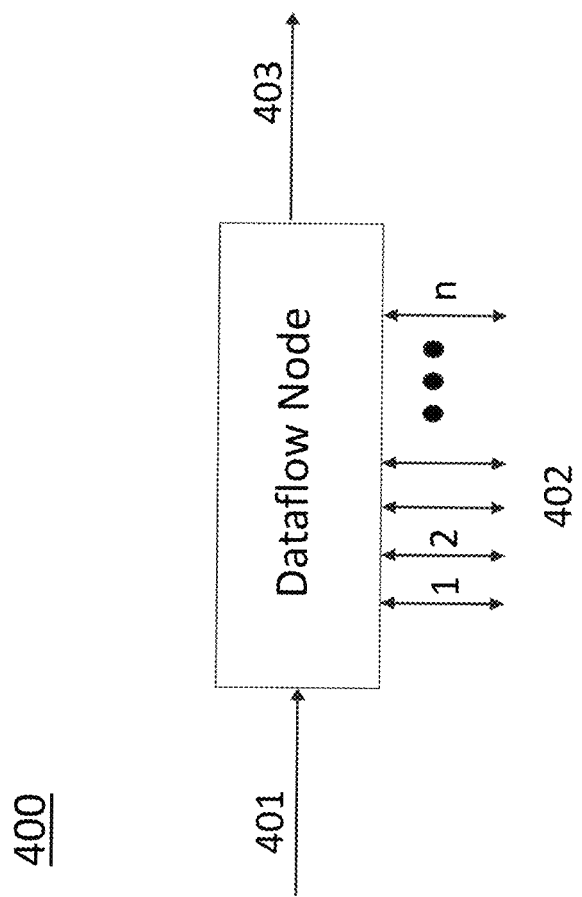
FIG. 4 illustrates the schematic diagram of a dataflow node according to an embodiment of the invention.

Referring to FIG. 4, dataflow node 400, e.g. Gorilla Dataflow (GDF) node, is shown according to an embodiment of the invention. Dataflow node 400 uses a rendezvous mechanism for communication between dataflow nodes. Its rendezvous mechanism may be implemented using FIFO interfaces, adopted from the theory of latency-insensitive designs. In addition to push-only, one-way interfaces, dataflow node 400 has two-way request/reply interfaces, also known as offload interfaces.

Referring to FIG. 4, dataflow node 400 includes input 401, output 403, and offload interface 402. In an embodiment, the offload interface includes n offload interface nodes ($402_1$, $402_2$ . . . and $402_n$). Furthermore, each node with offload interface may be split into multiple nodes and each offload interface can be modeled as two one-way interfaces. Therefore, in an embodiment of invention, dataflow node 400 is transformed into a dataflow graph without requiring any two-way offload interface. In an embodiment, dataflow node 400 uses offload interfaces as first-order construct in order to improve the expressiveness and analyzability of the model.

Referring back to FIG. 4, a dataflow node 400 may have one input 401, one output 403, and several offload interfaces nodes 402 ($402_1$, $402_2$ . . . and $402_n$). In an alternative embodiment, a dataflow node may have zero offload interface node. In an embodiment, dataflow node may have multiple input/output interfaces, for example, for the purpose of merging or distributing data elements. In such an embodiment, the nodes may only be able to reorder the data elements and may not be able to change the data elements themselves. These nodes may be transparent to the programmers and may be used in composition of nodes. In an embodiment, connecting the nodes together is done using a predefined set of composition functions.

Figure 5:
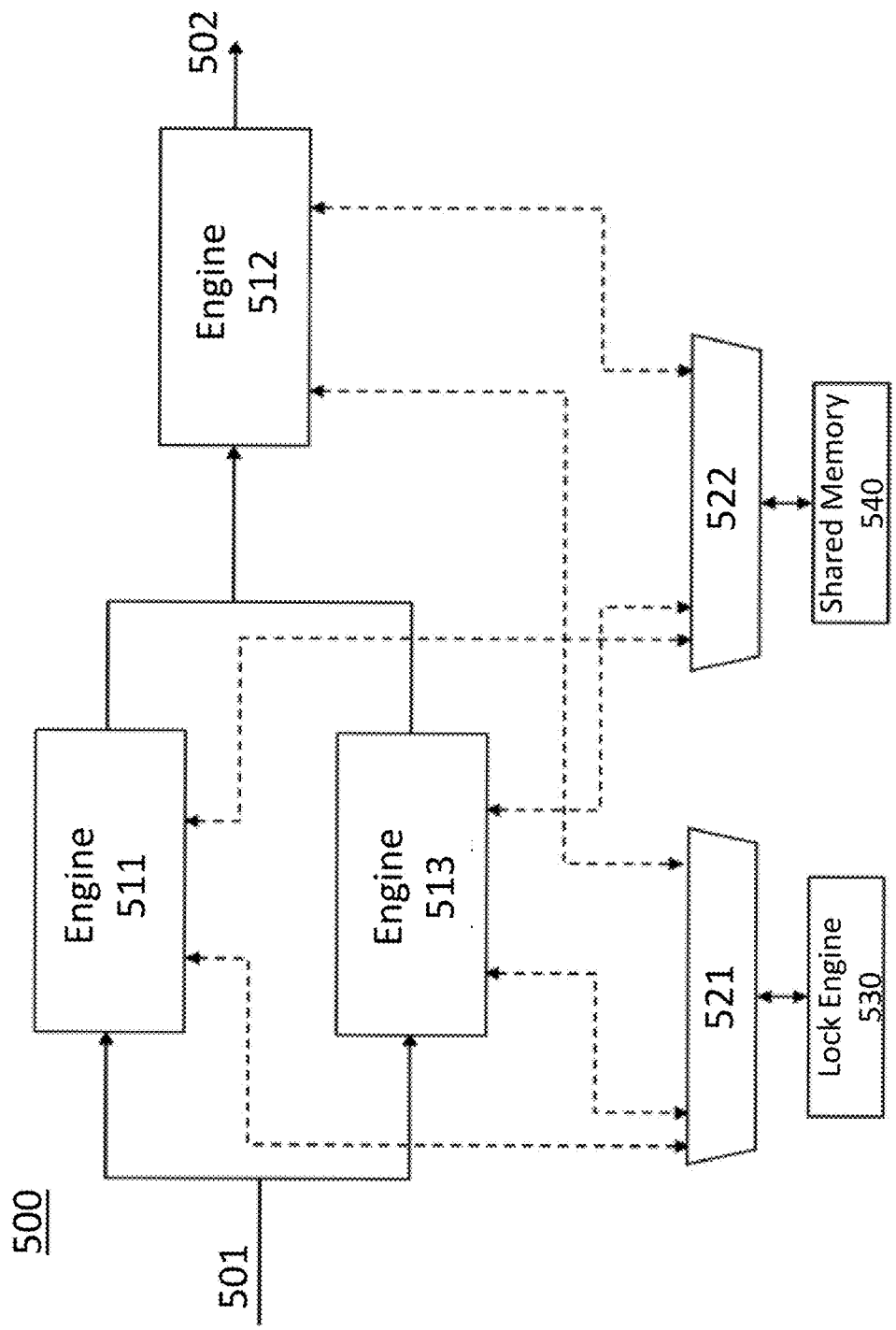
FIG. 5 illustrates the schematic diagram of composition of multiple nodes using lock-based synchronization mechanism to access a shared memory according to an embodiment of the invention.

FIG. 5 illustrates the schematic diagram of composition of multiple nodes using lock-based synchronization mechanism to access a shared memory. In standard dataflow centric models of computation, e.g., KPN model, every dataflow node is supposed to receive self-contained token(s) that carry the data for processing. The nodes do not need any global states to process the incoming tokens. Gorilla++ target applications, however, need to access global states, e.g., shared data structures. Gorilla++ uses a lock-based synchronization mechanism to solve this problem. Gorilla++ uses shared memories to save the global data.

Referring to FIG. 5, engines 511, 512, and 513 are connected through their input/output interface represented by the solid lines to process input 501 and generate output 502. Engines 511, 512, and 513 use offload interfaces to access shared memory 540 represented by the dashed lines. Shared memory 540 may be used to store global data. Since multiple dataflow nodes may access a shared memory, Gorilla++ may require a necessary synchronization mechanism to ensure mutual exclusion while accessing the data. Referring to FIG. 5, lock engine 530 is used for synchronization. Lock engine 530 is accessed by the engines 511, 512, and 513 through offload interfaces represented by the dashed lines. In an embodiment, lock engine 530 does not reply to a lock request from the corresponding engines 511, 512, and 513 unless either (i) the lock is not taken in the first place or (ii) the lock is released and the requester of the lock is the winner among all other lock requesters. Blocks 521 and 522 represent the lock construct interface in Gorilla++.

As and example, in an embodiment, pseudocode below could be used to compose the two types of engines, memory, and lock components to build the design presented in FIG. 3:

add=Engine("add.c"); decrement=Engine("decrement.c")
mem=mem(height=1, width=32); lock=lock(height=1)
Design=Offload(Chain(Replicate(add, 2), decrement), mem, lock)

The pseudocode above shows how the computation engines are generated by calling Engine function and passing the corresponding C code as the argument. Similarly, the memory and lock components are generated by calling appropriate functions. Replicate is a composition function that creates multiple instances of its input component to increase its throughput. In this example, a replicated version of the add component is created with a replication factor of two. Chain is used to connect the output of one component to the input of another one and create a larger component. In this example design, the "add" and "decrement" components are chained. Finally, Offload connects one component's offload interface to another component's input/output interface. In this example, "mem" and "lock" components are connected to the "add" and "decrement" components using offload interface.

In an embodiment, a computation consists of multiple phases. In each phase, the dataflow nodes may execute different computation kernels. In GDF, the current phase may be attached to all data elements, which are moved across the system in order to specify the changes in the computation phases.

Referring back to FIG. 5, each of engines 511, 512, and 513 may have four distinct memories: (i) in-token memories, (ii) out-token memories, (iii) context memories, and (iv) shared memories. Incoming data elements are copied into in-token memories and outgoing data elements are copied into out-token memories. Context memories include the data states private to the computation associated to a given input token. When processing a new token, the previous content of these memories does not affect the output results. Shared memories are the data states, which are shared between computations of different input data elements for a single kernel or even computations of different kernels. A kernel needs to be explicitly defined as a client of a shared memory scope or the shared memory is not accessible to the kernel.

Different embodiments may use different implementation of GDF. For example, different implementation of GDP on a system with respect to realization of (i) computation kernels, (ii) dataflow (streaming) channels, (iii) memory components, and (iv) synchronization components may be used. In an embodiment, a part of the GDF can be implemented as hardwired hardware on an FPGA substrate and the rest of GDF can be implemented in software on a CPU. In such an embodiment, when there is a streaming channel between two nodes and one node is on the hardware and the other node is on the software, a special hybrid FIFO with hardware interface on one side and software interface on the other side may be used. In an embodiment where multiple streaming channels are crossing the hardware/software boundaries, hybrid FIFOs can be virtualized over a physical interface, e.g., PCIe interface.

In an embodiment of the invention, the kernels may be realized as hardwired control state machines, synthesized, for example, in any of FPGA, ASIC, or CGRA substrate. In an alternative embodiment, the kernels may be realized as instruction-based computation cores with or without specialized data-path operations. In an embodiment of the invention, the communication channels may be implemented as hardware FIFO channels. In an alternative embodiment, the communication channels are implemented as software FIFOs. In an embodiment, all three types of memories in Gorilla++ may be implemented in a global monolithic memory. In an embodiment, each memory is customized into local registers, local scratch-pads, local coherent memory subsystems, or global coherent memory system. In an embodiment, synchronization components may be implemented in hardware. In another embodiment, the synchronization is implemented using software-based synchronization mechanisms. The software-based synchronization mechanism may be implemented on top of a coherent and consistent memory system.

Figure 6:
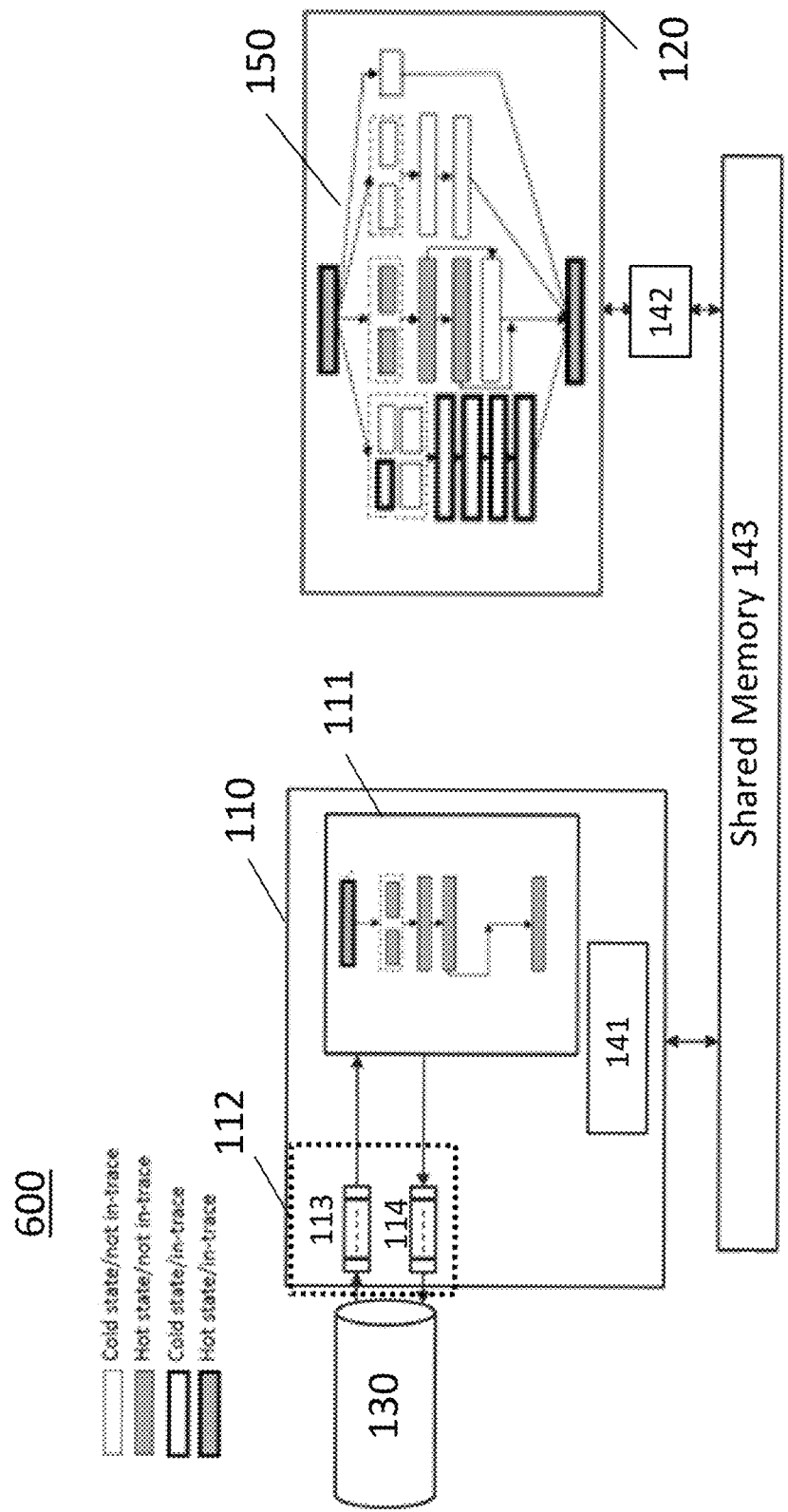
FIG. 6 illustrates the schematic diagram of execution of an application by data processing system according to an embodiment of the invention.

FIG. 6 illustrates the schematic diagram of processing of an application by data processing system according to an embodiment of the invention. FIG. 6 illustrates another embodiment in which the same reference numerals have been used to denote similar elements, parts and components to those of the embodiment depicted in FIG. 1. A detailed discussion of similar components and similar functionality will therefore not be repeated for the sake of brevity, and only the differences between the first and second embodiments will be described in detail.

At compile time, the program is parsed and translated to generate application control and data flow graph (CDFG) 150. In an embodiment, high-level synthesis reads a high-level description and translates it into a CDFG intermediate form. The CDFG intermediate form should represent all the necessary control and dataflow information. Referring to FIG. 6, operations of the CDFG 150 have been divided into hot operations and cold operations. The hot operations are operations frequently used during the profiling phase of the application. On the other hand, the cold operations are operations that are not frequently used during the profiling phase. In FIG. 6, the hot operations are shaded while the cold operations remain blank. The hot operations of CDFG 150 provide the basis for formation of the system's fast-path. The hot operations of CDFG 150 run on in-line accelerator 111. In an embodiment, in-line accelerator 111 is an FPGA. In an embodiment, in-line accelerator 111 is part of I/O processing unit 110. In an embodiment, several in-line accelerators may be used to implement hot operations of CDFG 150. The cold operations are executed using general purpose instruction-based processor 120.

Referring to FIG. 6, at runtime, the input packets are fed to the in-line accelerator 111 through receive FIFO storage 112 and the generated packets are sent over network 130 by the in-line accelerator 111 through transmit FIFO storage 114. In an embodiment, when an input data enters the in-line accelerator, the in-line accelerator can process the data as long as the execution trace remains in the fast-path. In FIG. 5, the operations that are actually executed in run-time are shown with a bold border. Since the execution trace exits the fast-path in the example illustrated in FIG. 6, bailout from in-line accelerator to general purpose instruction-based processor occurs. More specifically, referring to the example of FIG. 6, the execution trace exits the fast-path after the first state and therefore the in-line accelerator 111 cannot process the input data anymore. The in-line accelerator 111 may terminate the execution for the given input packet and bailout after the execution of the first state.

Upon premature termination of execution by in-line accelerator 111 the execution may be automatically transferred to software running on a general purpose instruction-based processor. The general purpose instruction-based processor may either continue the execution of the program from a state following the bailout point (continuation method) or it may restart the execution from the beginning (rollback method). When rollback method is used, software restarts the execution of the engine from the beginning. When continuation method is used the software continues the execution of the engine from the state following the bailout point. Transfer of execution is discussed in more details below.

Figure 7:
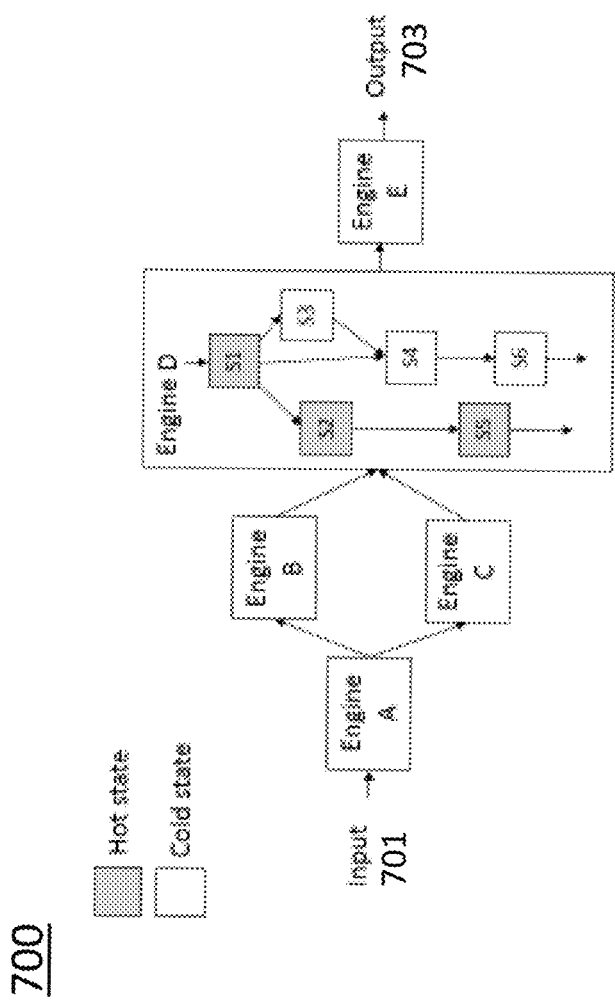
FIG. 7 illustrates the schematic diagram of execution of an application sliced into hot/cold operations by the data processing system according to an embodiment of the invention.

FIG. 7 illustrates the schematic diagram of processing of an application engine sliced into hot/cold operations by the data processing system according to an embodiment of the invention. The diagram 700 includes engines A, B, C, D and E interconnected to perform computation on input data elements received from input 701. The computation results are outputted through output 703. The diagram 700 may depict the slicing of a Gorilla kernel into hot states and cold states as explained before. In such an embodiment, each engine may be a GDF node. Each engine may include several execution states, for example, engine D may include states S1-S6. In the example of FIG. 7, states S1, S2, and S5 are hot states and States S3, S4, and S6 are cold states. In an embodiment, each engine may be implemented by an in-line accelerator, a general purpose instruction-based processor, or the combination of the two.

In case of a multi-layer acceleration system, each engine may also be implemented in any of the different acceleration levels depending on the hotness level of its operations. For brevity, the rest of the document discusses the transfer of data and control only between a single in-line accelerator and the general purpose instruction-based processor. However, the same methodology can be used for transferring data and control between multiple accelerator levels between the general purpose instruction-based processor and in-line accelerator as well.

The automated transferring of execution from the in-line accelerator to the general purpose instruction-based processor must be such that the flow of execution remains consistent. In an embodiment, transferring of the execution between the in-line accelerator and the general purpose instruction-based processor may occur at the boundary of two engines during an inter-engine transition. The transfer of execution between dataflow nodes may also be referred to as coarse-grain transfer. For example, in FIG. 7, the two engines A and B are in a back-to-back dataflow relationship (e.g., chain relationship). Engine A may be implemented as a hard-wired hardware engine and engine B may be implemented as a software engine. In an embodiment, the transfer of execution may occur upon the completion of execution by hardware engine A. In such a case, after hardware engine A finishes its execution normally, its output data is passed to the next engine, engine B, which is running as software. In such an embodiment, the context memory, which is completely dependent on the input token of hardware engine A, does not have to be transferred. In an embodiment, there may be a shared memory between the two engines A and B. The shared memory may be implemented using a coherency mechanism across the in-line accelerator and the general purpose instruction-based processor.

In an embodiment, transferring of the execution between an in-line accelerator and a general purpose instruction-based processor may be required at any point of processing other than the boundary of two engines. For example, in an embodiment, the transition may occur in the middle of an execution by an engine. The transfer of execution inside a data flow engine node may also be referred to as fine-grain transfer. Under these circumstances, the general purpose instruction-based processor is required to continue the execution in a way that the flow of execution remains consistent. This is especially important and challenging as the realization of each program operation in the accelerator may be in the form of some atomic units including state(s) of a state machine or stage(s) of a pipeline in a hardwired hardware, instruction(s) in SIMD lane(s) in a GPGPU, or micro-code instruction(s) in a network general purpose instruction-based processor. Each of these atomic forms might cover one or more operations associated with the computation of the corresponding kernel. An atomic form might cover only part of an operation and consequently realization of an operation might need multiple units of these atomic units. As a result, when the execution of one of these atomic units terminates on the in-line accelerator side, it is challenging to jump to the right instruction on the general purpose instruction-based processor side that can guarantee a continuous flow of execution. Similar problem may exist when transferring the execution from the general purpose instruction-based processor to the in-line accelerator.

In an embodiment of the invention, the bailing point may be determined using a compilation analysis. The compilation analysis of the engine currently executing the application may suggest how far the execution has been performed.

In an embodiment of the invention, a state machine simulation mechanism is used to achieve precise continuation from an engine, implemented as hardware state machine, to software. The state machine simulation mechanism may provide simulation of hardware state machine on the slow-path state machine on the general purpose instruction-based processor. In an embodiment, the slow-path state machine simulation can be generated from the output of an HLS tool that synthesizes the sliced engine code. In an embodiment, for the accelerated engines, the software will contain the simulated slow-path in addition to the original software engine. Upon occurrence of a bailout, the system may decide to pursue the continuation method by transferring the execution to the corresponding bailout stage in the simulated slow-path state machine. In an embodiment, if the system decides to pursue a rollback method, the execution is transferred to the beginning of the corresponding software engine that is running as natively.

Figure 8:
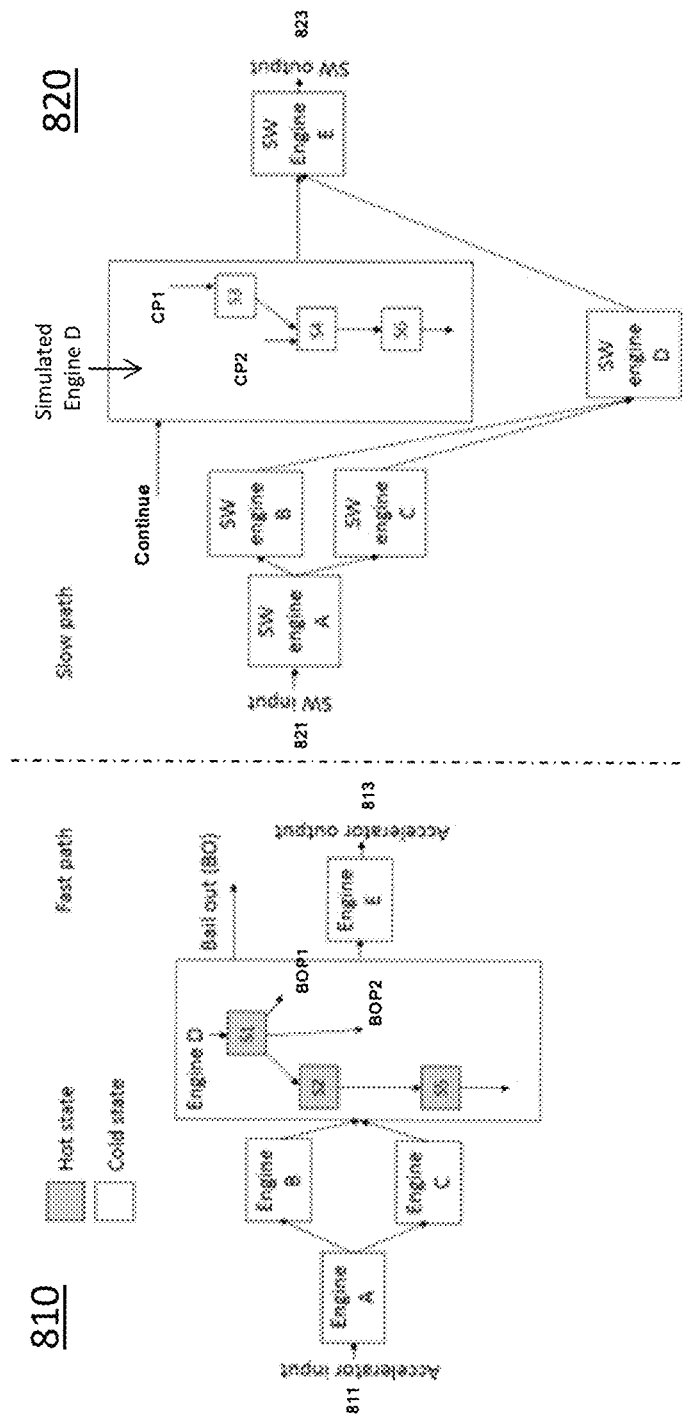
FIG. 8 illustrates the schematic diagram of a state machine simulation mechanism in accordance with an embodiment of the invention.

FIG. 8 illustrates the schematic diagram of a state machine simulation mechanism in accordance with an embodiment of the invention. Diagram 810 shows the schematic diagram of fast-path processing of an application sliced into hot/cold operations. Diagram 820 shows the schematic diagram of slow-path state machine simulation of the fast-path according to an embodiment of the invention. Fast-path diagram 810 includes engines A, B, C, D and E interconnected to perform computation on input data elements received from accelerator input 811 and to output the generated output data elements from accelerator output 813. Slow-path diagram 820 is a software simulation of fast-path diagram 810. Upon termination of execution on the fast-path, the bailout point along with the necessary state values is sent to the software engine that simulates the behavior of the state machine.

Referring to fast-path diagram 810, a bailout may occur at first state S1 of engine D. There may be two bailout points (BOP1 and BOP2) associated with different execution routes of the application. As such, the execution terminates in fast-path prematurely. Accordingly, bailout points BOP1 and BOP2 are communicated to the state machine simulator in slow-path 820. In an embodiment, all necessary state values are also communicated to the state machine simulator. Referring now to slow-path diagram 820, the state machine simulator may determine the termination stage of the execution on fast-path 810 and continue the execution on slow-path 820. In an embodiment, the state machine simulator continues the execution of the engine at continuation points CP1 and CP2 corresponding with bailout points BOP1 and BOP2 respectively on simulated engine D. The simulator may complete the execution of the application.

In an embodiment, the state machine simulator only emulates the engine that is currently engaged in the execution. Upon termination of the execution by the current engine, the next engines in the slow-path can be executed natively. For example, after the execution of engine D is completed in the state machine simulator, the result may be passed to a native code (and not the simulated code) of engine E for further computation. In such an embodiment, some performance implications for the slow-path may be avoided. In an embodiment, the slow-path part of the engine may be re-factored into multiple engines in order to decrease the overhead of state machine simulation by forcing the execution to switch to native mode earlier.

In an embodiment of the invention, upon premature termination of execution on the in-line accelerator, the general purpose instruction-based processor restarts the execution of the input data as if no processing was done by the in-line accelerator. In an embodiment, in contrast with the continuation method that execution was transferred to the corresponding bailout stage in the simulated slow-path state machine, the execution may be transferred to the beginning of the corresponding software engine that will be running as natively. This method of transferring the execution is referred to as a rollback method. Referring back to FIG. 8, for example, upon termination of the execution by engine D at state S1, the general purpose instruction-based processor may begin the execution at state S1 again, instead of continuing to S2. In such an embodiment, the execution of the trace on the accelerator may be done speculatively. In an embodiment, the side effects of the computation on memories by the in-line accelerator may be rolled back and the general purpose instruction-based processor (or the next level accelerator) may reprocess the data.

Another problem associated with transferring execution between an in-line accelerator and a general purpose instruction-based processor (or the next level accelerator) is transferring the necessary data state between them. The required data that is transferred between the in-line accelerator and the general purpose instruction-based processor (or the next level accelerator) may depend on the type of control transfer method adopted by the system. In an embodiment, the required data to be transferred using a rollback method is different than the required data to be transferred using a continuation method.

Figure 9A:
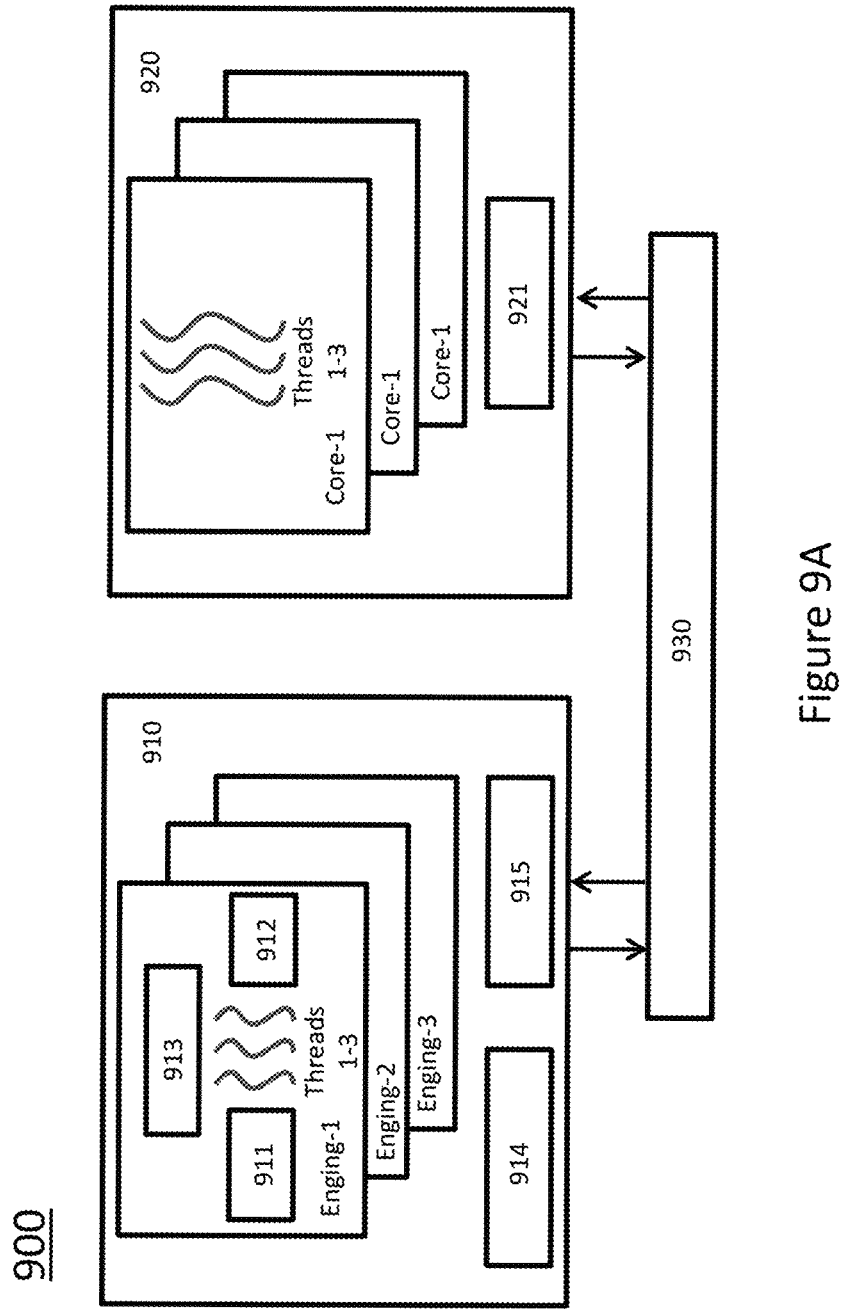
FIG. 9A illustrates the schematic diagram of memory block architecture in accordance with an embodiment of the invention.

FIG. 9A illustrates the schematic diagram of memory block architecture in accordance with an embodiment of the invention. The processing system 900 includes an in-line accelerator 910 and a general purpose instruction-based processor 920. In an embodiment, the general purpose instruction-based processor 920 may be a multi-core general purpose instruction-based processor including core-1, core-2, and core-3. An operating system may divide the processing time of the multi-core general purpose instruction-based processor and assign threads to the resulting time slots so that the general purpose instruction-based processor runs multiple threads concurrently. A thread is a unit of executing programs. In FIG. 9A, core-1 has been assigned the threads 1-3 for processing. In an embodiment, a multi-core general purpose instruction-based processor system has a distributed system structure such that each central processing unit (CPU) has dedicated memory and accesses shared memory when other data is needed (not shown in the figure). In another embodiment, a multi-core general purpose instruction-based processor system has a centralized shared system structure such that each CPU has only cache memory and stores necessary data in shared memory (not shown in the figure).

Referring to FIG. 9A, general purpose instruction-based processor 920 includes coherent cache 921. Coherent cache 921 may be used to manage conflicts between storage mechanisms of core-1, core-2, and core-3. In an embodiment, coherent cache 921 may also maintain consistency between the general purpose instruction-based processor 920 and main memory. To reduce latency, in alternative embodiments, often one or more levels of high-speed cache memory are used to hold a subset of the data or instructions that are stored in the main memory.

In an embodiment of the invention, in-line accelerator 910 may include multiple engines 1-3. Each engine may execute multiple threads 1-3. Each engine includes in-token memory 911, out-token memory 912, and context memory 913. Incoming data elements are copied into in-token memory 911 and outgoing data elements are copied into out-token memory 912. Context memory 913 stores transient context data (e.g., packet/frame data) that is unique to a specific process, along with pointers that reference data structures and tables stored in. Context memory 913 includes data states private to the computation associated to a given input token. When processing a new token, the previous content of these memories does not affect the output results.

In an embodiment, in-line accelerator 910 further includes accelerator level shared memory 914. Accelerator level shared memory 914 stores data states that are shared between computations of different input data elements for a single kernel or computations of multiple kernels. A kernel may need to be explicitly defined as a client of a shared memory scope or the shared memory may not accessible to the kernel. The shared memory must be coherent with the global shared memory which shared between the process and in-line accelerator (or other layers of acceleration in a multilayer scenario). In-line accelerator 910 also includes coherent memory 915. Coherent cache 915 may manage conflicts between engine storage mechanisms and maintain consistency between in-line accelerator 910 and main memory. To reduce latency, in alternative embodiments, often one or more levels of high-speed cache memory are used to hold a subset of the data or instructions that are stored in the main memory.

In-line accelerator 910 (and other accelerators in different acceleration layers) and general purpose instruction-based processor 920 both are coupled to global shared memory 930. Global shared memory may be in communication with coherent caches 915 and 921. Global states, e.g., shared data structures, may be stored in global shared memory 930 and may be accessed by both in-line accelerator 910 and general purpose instruction-based processor 920 (or other accelerators in a multilayer system). Synchronization mechanisms to ensure mutual exclusion of data may be used as explained before to manage the access of shared data in global shared memory 930.

In transferring execution from the in-line accelerator to the general purpose instruction-based processor, it may be necessary to transfer data between different memory components. Once the in-line accelerator begins execution, engine-1 accesses the input data elements stored in in-token memory 911 for computation. Throughout the execution by in-line accelerator 910, changes may be made to data stored in context memory 913 and shared memories 914 and 930. The output data elements generated by the engine-1 are also stored in out-token memory 912. Therefore, upon termination of the execution by the in-line accelerator 910 the state of the stored data may be altered relative to the start of the execution.

In an embodiment, transferring of data between the in-line accelerator and the general purpose instruction-based processor may occur at the boundary of two engines during an inter-engine transition. This kind of transfer of execution between dataflow engine nodes may also be referred to as coarse-grain transfer. For example, referring back to FIG. 8, the two engines A and B are in a back-to-back dataflow relationship (e.g., chain relationship). Engine A may be implemented as a hard-wired hardware engine and engine B may be implemented as a software engine. In an embodiment, the transfer of execution may occur upon the completion of execution by hardware engine A.

In such an embodiment, the system may perform transfer of data using virtual channels to move the data elements between the in-line accelerator and the general purpose instruction-based processor. Multiple virtual channels can be used on a single physical interface (e.g. a PCIe interface). In an embodiment, the elements stored in the in-token memory 911 and context memory 913 does not need to be transferred. However, the changes to the global shared memory must become visible to the software engine. In coarse-grain transfer, output token may also transferred to the input token of the software engine through virtual channels as discussed before.

In an embodiment, transferring of the execution between an in-line accelerator and a general purpose instruction-based processor may be required at any point of processing other than the boundary of two engines. In an embodiment, the transition may occur in the middle of an execution by an engine. For example, referring back to FIG. 8, engine D may terminate execution at very first state S1. As such, transfer of data between the in-line accelerator and general purpose instruction-based processor may occur inside a dataflow node. Upon termination of execution on engine D, the bailout point along with the necessary state values is sent to a software engine. The software engine may be a state machine simulator that emulates the behavior of the state machine, as explained above with respect to continuation method.

In such an embodiment, the input data elements stored in in-token memory 911 may be needed to complete the execution. Therefore, the input data elements may be copied to an in-token memory of the software engine on general purpose instruction-based processor. Since part of output data might be constructed already, the output data elements stored in out-token memory 912 may be required to be transferred to the subsequent engine. As such, the content of out-token memory 912 may be copied to an out-token memory of the software engine. Similarly, the changes to the context memory 913 may be copied to a dedicated place visible to the software engine in order to continue execution from the bailing point. In an embodiment, the changes to content of global shared memory 930 may already be visible and coherent from the general purpose instruction-based processor side. In such an embodiment, no further action may be required. In an alternative embodiment, at least a portion of the changes made by in-line accelerator 910 to content of the global shared memory 930 may not be visible or coherent form the general purpose instruction-based processor perspective. As such, those changes may be copied to a dedicated place visible to the software engine on the general purpose instruction-based processor 920. In an embodiment, the content of the context memory 913 is made available to the general purpose instruction-based processor 920. In other embodiments, the content of the context memory 913 is only copied to a memory accessible to the software engine if the content is predicted to be used in the future computation of the software engine. In an embodiment, such a predication will be based on a prediction mechanism at the compilation time, using profiling or static data-flow analysis.

In an embodiment of the invention, upon termination of the execution on the in-line accelerator, the general purpose instruction-based processor restarts the execution of the input data as if no processing was done by the in-line accelerator (rollback method). Referring back to FIG. 8, for example, upon termination of the execution by engine D at state S1, the general purpose instruction-based processor may begin the execution at state S1 again, instead of continuing to S2.

In such an embodiment, the input data elements stored in in-token memory 911 may be required to perform the necessary computation. As such, the content of in-token memory 911 must be copied to a memory accessible to the general purpose instruction-based processor. On the other hand, because general purpose instruction-based processor 920 restarts the execution as if no processing was done by in-line accelerator 910, the content of out-token memory 912 and context memory 913 may be ignored. In an embodiment, the changes made to shared memory 930 by in-line accelerator 910 may be rolled back. In an embodiment, if reversing the changes is not possible the system may not be able to perform the rollback method and may perform the continuation method instead.

Table 1 below shows the summary of state transfer for different memory types when transitioning from hardware accelerator to software under different scenarios according to an embodiment of invention.

TABLE 1

Data state transfer for different memory types upon bailout.

|  | Coarse-grain | Fine-grain/rollback | Fine-grain/Continuation |
| --- | --- | --- | --- |
| Control transfer | Jump to the next SW engine | Jump to the SW engine associated with this accelerated engine (with the native execution) | Jump to the corresponding operation in the simulated slow-path engine of this HW engine |
| In-token memory | No action necessary | Copy to in-token memory of SW engine | Copy to in-token memory of simulated HW engine if used later |
| Out-token memory | Copy the output token to the input of the next SW engine | No action necessary | If changed, copy to out-token memory of simulated HW engine if used later |
| Context memory | No action necessary | No action necessary | If used later, changes must be copied to context memory of the simulated HW engine |
| Shared memory | Changes must become visible to SW | The changes must be rolled back | Changes must become visible to the simulated HW engine |

The transfer of data state from context and shared memories in continuation method can be complicated and may generate a high overhead. The next section discusses mechanisms to implement these transfers more efficiently.

In an embodiment, during the bailout, the system maps all the shared memories that have a client engine with the possibility of bailout as part of a memory space that is coherent from the general purpose instruction-based processor point of view. Therefore, upon continuation, the latest data states in these memories may become automatically visible by the software engines on the general purpose instruction-based processor. In an alternative embodiment, the system changes the shared memories in a way that they are not coherent from the general purpose instruction-based processor side before the bailout and becomes coherent only after the bailout point. This will reduce the overhead of keeping all shared memories coherent all the time.

In an embodiment, in addition to the shared memories, all the state data may be required to become available to the engine software, e.g. simulator, on the general purpose instruction-based processor side. In an embodiment, all in-token, out-token, and context memories are copied to the general purpose instruction-based processor side. In an embodiment, a bailout table is used to minimize the overhead of the transfer as explained further below.

FIG. 10 illustrates the schematic diagram of implementing a bailout table in accordance with an embodiment of the invention. In an embodiment, transfer of data between in-line accelerator 1010 and general purpose instruction-based processor 1020 is managed by bailout table 1030. Bailout table 1030 keeps track of a set of variables for each bailout case. The set may include only the necessary variables to continue execution. In an embodiment, for each bailout point, the bailout table 1030 may include a set indicating which variables might have been used in a write operation and later be used in a read operation. In an embodiment, the bailout table includes two sections. The first section 1031 keeps track of the memory elements written by previous operations in the engine. The second section 1032 keeps track of the memory elements that later might be read by next operations after bailout. In an embodiment, these memory elements may belong to any of the in-/out-token, context or shared memories explained in previous section.

In an embodiment, bailout table 1030 may be generated in a fully static (compiler based) approach. In an embodiment, bailout table 1030 is populated using a static compiler analysis. In an embodiment, the analysis may be performed while the accelerated engine code is being generated during compilation time. In an embodiment, the compiler may use a conservative data-flow analysis to find the possible write set before the bailout and possible read set after the bailout. The compiler may use classic dataflow dependency analysis to generate the bailout table.

In an embodiment, bailout table 1030 may be generated in a fully dynamic (runtime based) approach. In an embodiment, tracking the variables that have been used in a write operation in the bailout table can be maintained dynamically using an extra bit added to each value (for example, in memories or registers). In compiler-based approach, a more conservative data-flow analysis may be used and the bailout table 1030 may store unnecessary variables (or memory ranges). The dynamic written-bit tracking method may be more costly at runtime. The dynamic method may not determine if the marked variables will be used after continuation.

In an embodiment, the combination of the runtime-based and compiler-based approach is used to populate bailout table 1030. In an embodiment, the compiler statically generates the table for candidates using a compile time analysis. At runtime, however, the accelerator may only transfer the variables or rangers in the table that have their written-bit set.

In an embodiment, big data structures such as arrays may be tracked in bailout table 1030 as a set of memory ranges in the table. In other embodiments, the big data structures are tracked in bailout table 1030 by just storing the start of the array and a metadata representing the part(s) of the array that are modified and will be used by the software following continuation. In an embodiment, the metadata may be a data structure similar to interval trees stored as bitmaps out of bailout table. Each node in the tree may represent a range of the corresponding array elements that is modified by the accelerator and used later by the software following continuation. For example, in an embodiment, each node in the tree may be 32 bits and divided to four 8-bit components. The first two 8-bit components may store the range indexes for the array and the next two 8-bit components are pointers to the left and right children nodes of the node (8-bit offsets relative to the beginning of the tree data structure).

According to an embodiment of the invention, the bailout table 1030 is compressed by grouping the variables. In such an embodiment, the group identifiers are stored in the list rather than the variables themselves. In an alternative embodiment, instead of listing individual variables, the table can only include data groups where each group represents an address interval of the memory ranges modified by the hardware in-line accelerator 1010 and may be used later by a software engine in the general purpose instruction-based processor 1020.

In an embodiment, the copied values of the variables with high probability of being used by the remaining code in the slow-path are pushed to the lower level of cache hierarchy. In an embodiment, these variables are copied directly to the general purpose instruction-based processor cache. Therefore, an embodiment of the invention proposes having two sets of shared variables for each bailout point in bailout table 1030. The first may be the set of variables (or memory ranges) that are simply copied to the coherent global shared memory and become visible to the general purpose instruction-based processor immediately. The second set may be the set of variables which are pushed to the next level cache (evicted from accelerator local cache) in addition to get copied. The variables with high read probability on the slow-path may be identified using profiling of the application.

Table 2 is an example of a bailout table according to an embodiment of the invention. The bailout table provides the variables to track two bailout points (State-1 and State-2). The variables are divided in to two sets of "move set" and "move and push set". The variables under "move set" are the set of variables (or memory ranges) that are simply copied to the global shared memory that is coherent and become visible to the general purpose instruction-based processor. The variables under "move and push set" are the set of variables which are pushed to the next level cache (evicted from in-line accelerator local cache) in addition to get copied. In the example table below, State-1 includes a first set of variables {vid1, vid2} under "move set" category and a second set of variables {id3} under "move and push set" category. State-2, however, only includes one set of variables {(L1, U1), (L2, U2)} under "move set" category. In an embodiment, the bailout point may only include variables under "move and push set" category. These variables or ranges may belong to any one of in-token, out-token, context or shared memories.

TABLE 2

An exemplary bailout table according to an embodiment

| Bailout point | Move set | Move and push set |
| --- | --- | --- |
| State-1 | {vid1, vid2} | {id3} |
| State-2 | {(L1, U1), (L2, U2)} | |

In many cases, the overhead of computing the move set and performing the move is very high. This is particularly important given the fact that the in-line accelerator needs to be utilized for fast-path operations and having to store and move much information can be prohibitive. In such cases, it might be beneficial to roll back some of the accelerator computation. A pure rollback mechanism, however, may require an unbounded speculative memory to revert the modifications to the shared memories.

In an embodiment of the invention, the continuation and rollback methods are combined to make a more efficient transfer of execution from the in-line accelerator to the general purpose instruction-based processor. In an embodiment, certain pre-determined rollback points are defined in the fast path. The system may keep data written into the shared memory in a speculative state as long as possible. Upon a bailout, a rollback method may be used if the speculative data is not changed to non-speculative.

Figure 9B:
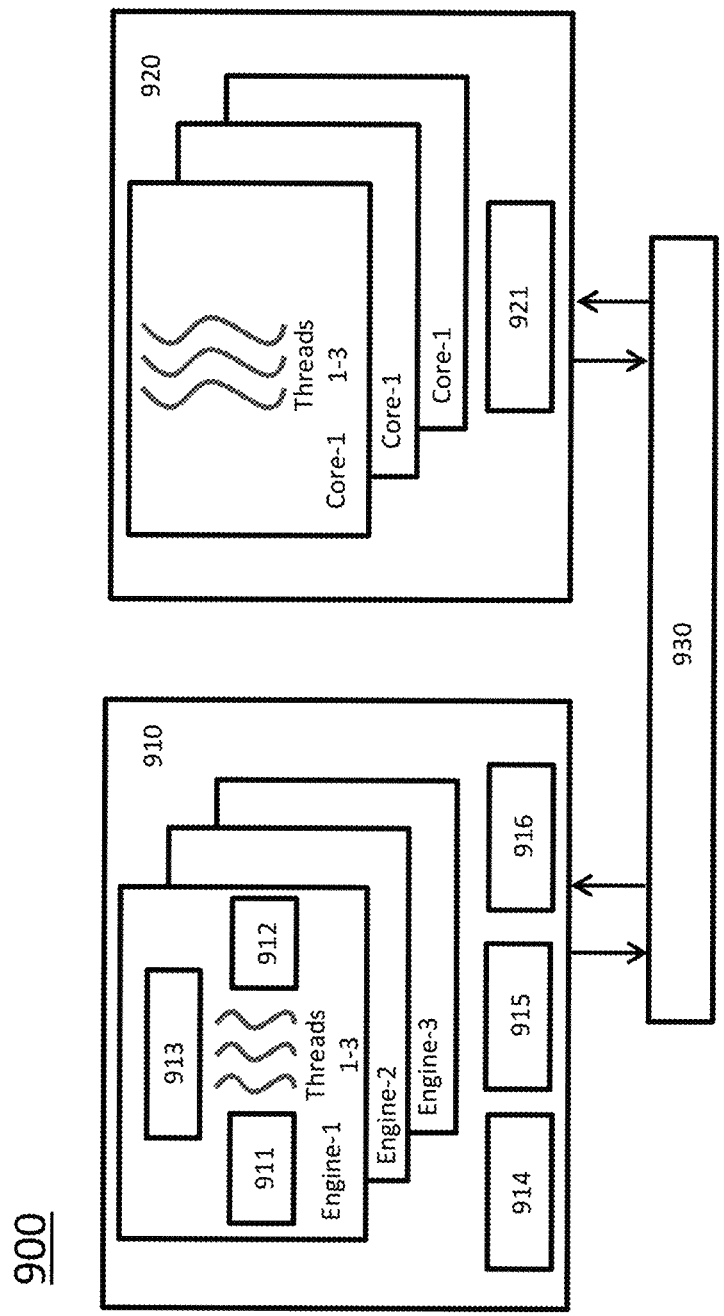
FIG. 9B illustrates the schematic diagram of memory block architecture including a quasi-speculative memory in accordance with an embodiment of the invention.

FIG. 9B illustrates the schematic diagram of memory block architecture including quasi-speculative cache in accordance with an embodiment of the invention. FIG. 9B illustrates another embodiment in which the same reference numerals have been used to denote similar elements, parts and components to those of the embodiment depicted in FIG. 9A. A detailed discussion of similar components and similar functionality will therefore not be repeated for the sake of brevity, and only the differences between the first and second embodiments will be described in detail.

In an embodiment, quasi-speculative memory 916 is used to postpone committing of the speculative data as long as possible. In a rollback method, quasi-speculative memory 916 may be used to rollback changes to the shared memory 930. In a continuation method, quasi-speculative memory 916 may be used to copy the changes on shared memory 930 for continuation purpose. While quasi-speculative memory 916 delays committing of the speculative data, it may not guarantee the rollback on speculative data when it runs out of speculative storage. In an embodiment, for a given input data, a rollback-based bailout can be done as long as all the data associated with the input is still not committed. In an embodiment, if any of the data associated with the input is committed only continuation method is possible.

In an embodiment of the invention, quasi-speculative memory 916, apart from standard load/store commands, includes commands to start, end, and abort a speculative session. Referring to table 3 below, some of the quasi-speculative cache commands are provided. The "begin speculative session" command may start a speculative session and get a thread id as an argument. From this point on, all the load and stores from this thread will be associated with the session. Later, when "end speculative session" is called, the memory may commit the speculative values to non-speculative ones. The "abort speculative session" instruction may abort all the changes associated with this speculative session or if abortion is not possible anymore, the memory may report it. At this stage, the set of variables, which are written by the thread during the speculative session, can be read using "get written-back set". The write set may be in form of a bit vector in that each bit indicates whether a memory word/block is written by the thread during the speculative session. "Write-back" command may be used when continuation happens and we know that the write-set of a thread will be used soon used by the slow path. In such situation writing back the write-set can improve the performance of the system.

In an embodiment, unlike conventional transactional memories, the abort mechanism is not an internal event. The abortion may occur based on an external request to the cache when bailout happens. An abort mechanism may be the desired bailout scenario. In quasi-speculative cache when there are conflicts between accesses from different threads and there is no more space to save the speculative value, the default behavior may commit the oldest speculative value to non-speculative state. This may make the session associated with the committed speculative value non-speculative. Therefore, the chance of using rollback for that particular speculative session may be eliminated. In an embodiment, unlike conventional transactional memory, the speculative memory does not need to support atomicity of transactions. If atomicity is required, it may be provided using synchronization mechanisms, e.g. lock engines explained in previous sections.

TABLE 3 speculative cache commands

| Command | Input | Output |
|---|---|---|
| Begin speculative session | Thread id | No output |
| End speculative session | Thread id | No output |
| Get written-back set | Thread id, address range | Write set bit vector |
| Abort speculative session | Thread id | Status (successful abort or not) |
| Standard load/store | Thread id, Address and/or store data | Read data or no output |
| Write-back | Thread id | No output |

In an embodiment of the invention, the system performs a cost analysis to determine whether to use continuation method or rollback method for a given bailout. Depending on the amount of data that needs to be transferred as well as the amount of pre-bailout computation, the cost of rollback or continuation may change. In an embodiment, the compiler may be used to calculate the cost of each method. The compiler may perform a static analysis and profiling phase to suggest rollback or continuation for a given bailout point. The in-line accelerator may later use these suggestions to perform rollback or continuation method. The following formulas can be used to estimate the cost for rollback and continuation:

Continuation Cost={Alpha×Move set size}

Move set size (continuation)={in-token and out-token move set size+context move set size+shared memory move set size}

Rollback Cost={(Alpha×Move set size)+(Beta×Compute overhead)+(Gamma×rollback size)}

Move set size (continuation)=in-token move set size
Rollback overhead=shared memory move set size The Alpha, Beta, and Gamma constants can be tuned for a specific architecture by running and profiling several workloads while measuring the actual latency of move set Tuning can be done once for a set of applications and later used for any other application. Alpha models the cost of moving data between the in-line accelerator and general purpose instruction-based processor (or, the next layer of in-line accelerator). Therefore, if in a system moving data is more expensive we will have higher Alpha value. Beta models the cost of computation in in-line accelerator. Therefore, in a system with a high performance in-line accelerator Beta is low and in a system with a low performance in-line accelerator Beta is high. Gamma models the cost associated with rolling back the speculative data (e.g. in quasi-speculative cache).

Figure 11:
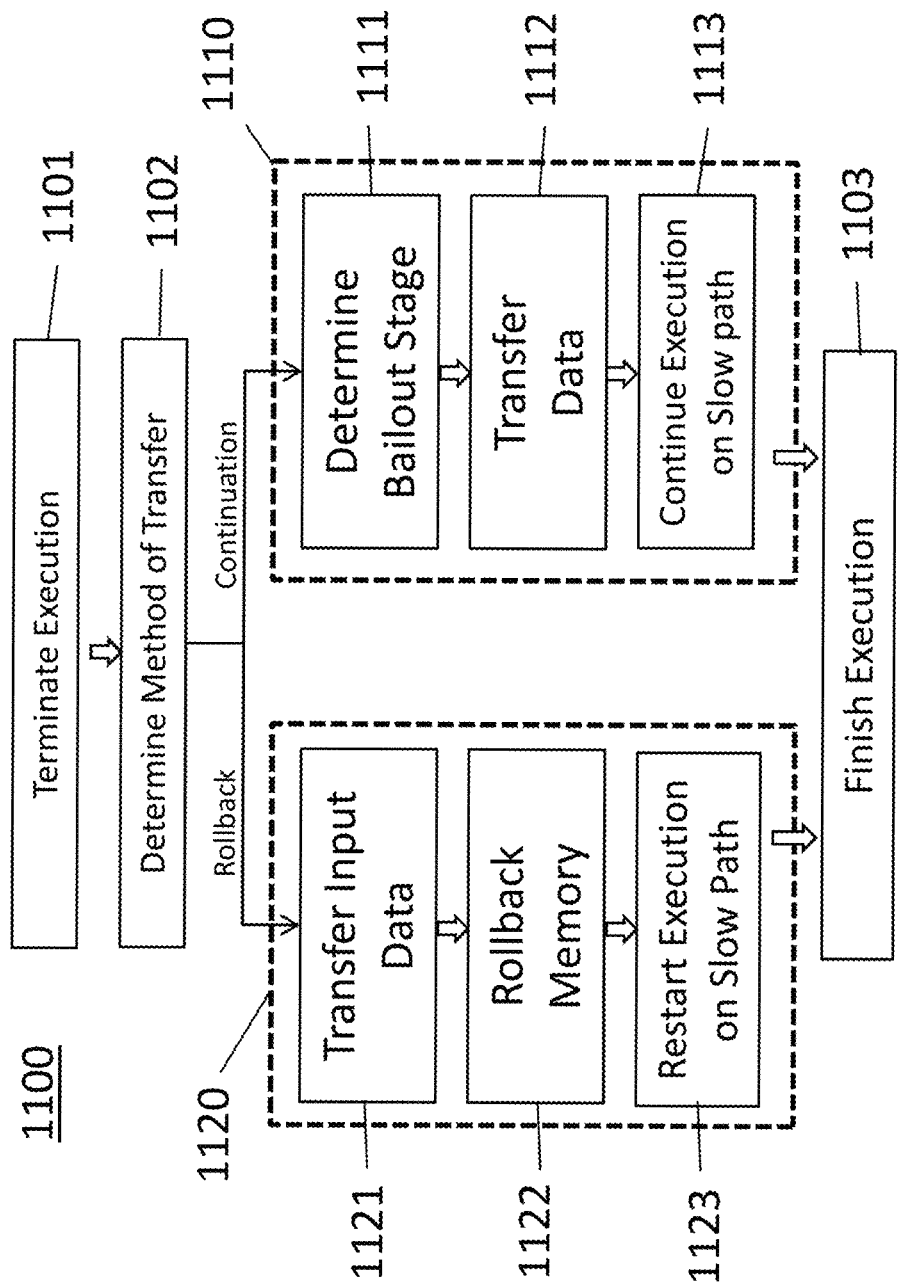
FIG. 11 is a flow diagram illustrating a method flowchart for transferring execution according to an embodiment of the invention.

FIG. 11 is a flow diagram illustrating a method flowchart for transferring execution according to an embodiment of the disclosure. Although the stages in the flowcharts with reference to FIG. 11 are shown in a particular order, the order of the actions can be modified. Thus, the illustrated embodiments can be performed in a different order, and some actions/blocks may be performed in parallel. Some of the blocks and/or operations listed in FIG. 11 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At stage 1101 of figure lithe execution by the in-line accelerator terminates prematurely. The processing point at which the execution of the application terminates is called the bailout point. To complete the execution of the application, the in-line accelerator may transfer the execution to another in-line accelerator or a general purpose instruction-based processor. The bailout point may occur at the boundary of two engines during an inter-engine transition or during execution by an engine.

At stage 1102 the in-line accelerator determines the appropriate method to implement the bailout. Bailout is the process of transitioning the computation associated with an input from the in-line accelerator to the general purpose instruction-based processor. In an embodiment, the in-line accelerator implements the bailout using a continuation method 1110. The continuation method 1110 is a kind of bailout in which the general purpose instruction-based processor continues the execution of input data on the accelerator from the bailout point. In another embodiment, the in-line accelerator implements the bailout using a rollback method 1120. In the rollback method 1120 the general purpose instruction-based processor restarts the execution of an input data from the beginning. In other embodiments, a combination of the continuation and rollback methods may be adopted by the in-line accelerator.

The determination of whether a continuation method 1110 is used or a rollback method 1120 depends upon multiple factors. In an embodiment, a cost analysis is performed according to this disclosure to determine the more efficient method under the circumstances. In an embodiment, the cost of transferring execution based on each method depends upon the amount data required to be transferred. In an embodiment, the default method of transferring execution is rollback method 1120. The implementation of rollback method 1120 may not be possible, however, where data has been committed to non-speculative storages. In an embodiment, the quasi-speculative cache is used to delay committing data to non-speculative storages.

At stage 1111 of continuation method 1110, the system determines the bailout point at which the execution of the application terminated prematurely. The determination of bailout stage facilitates continuation of execution by the general purpose instruction-based processor. In an embodiment, the execution is prematurely terminated at the boundary of two engines. In an embodiment, as shown in FIGS. 7 and 8, a state machine simulator on slow-path is used to emulate the in-line accelerator behavior. Upon occurrence of a bailout, the state machine simulator continues execution from the bailout point.

At stage 1112 of the continuation method 1110, the in-line accelerator transfers the necessary data to general purpose instruction-based processor to continue execution. In the continuation method 1110, all content of in-token, out-token, and context memory may be required to be available to the general purpose instruction-based processor. In an embodiment, the changes made to the shared memory by the in-line accelerator may be required to become visible to the general purpose process. In an embodiment, a bailout table, as shown in FIG. 10, is used to selectively transfer only the required data states and avoid the overhead of transferring unnecessary additional data.

At stage 1113, the general purpose instruction-based processor continues execution of the application. In an embodiment, the execution is continued on a software engine, for example, a state machine simulator, on the slow-path.

In an embodiment of the invention, at stage 1102 the system may decide to transfer execution using rollback method 1120. In an embodiment, the rollback method 1120 may be the preferred method of bailout. At stage 1121 of the rollback method 1120 the necessary data may be transferred from the in-line accelerator to the general purpose instruction-based processor for execution. In an embodiment, the input data elements stored in in-token memory is transferred. In an embodiment, the out-token memory and context memory may be ignored.

At stage 1122, the changes to the shared memory must be rolled back. In an embodiment, a quasi-speculative cache is used to roll back changes made to the memory. In an embodiment, if the changes made by the in-line accelerator to the shared memory cannot be rolled back, rollback method 1120 may not be possible and continuation method 1110 is pursued.

At stage 1123, the general purpose instruction-based processor restarts the execution of the application as if no processing was done by the in-line accelerator. In an embodiment, at stage 1123 the execution of the CDFG is started by software from the beginning.

At stage 1103, the execution is finished by software engine on the general purpose instruction-based processor. In an embodiment, the application may be transferred to other software engines or may be transferred to a hardware in-line accelerator for further processing. In an embodiment, a response packet is generated at stage 1103.

Figure 12:
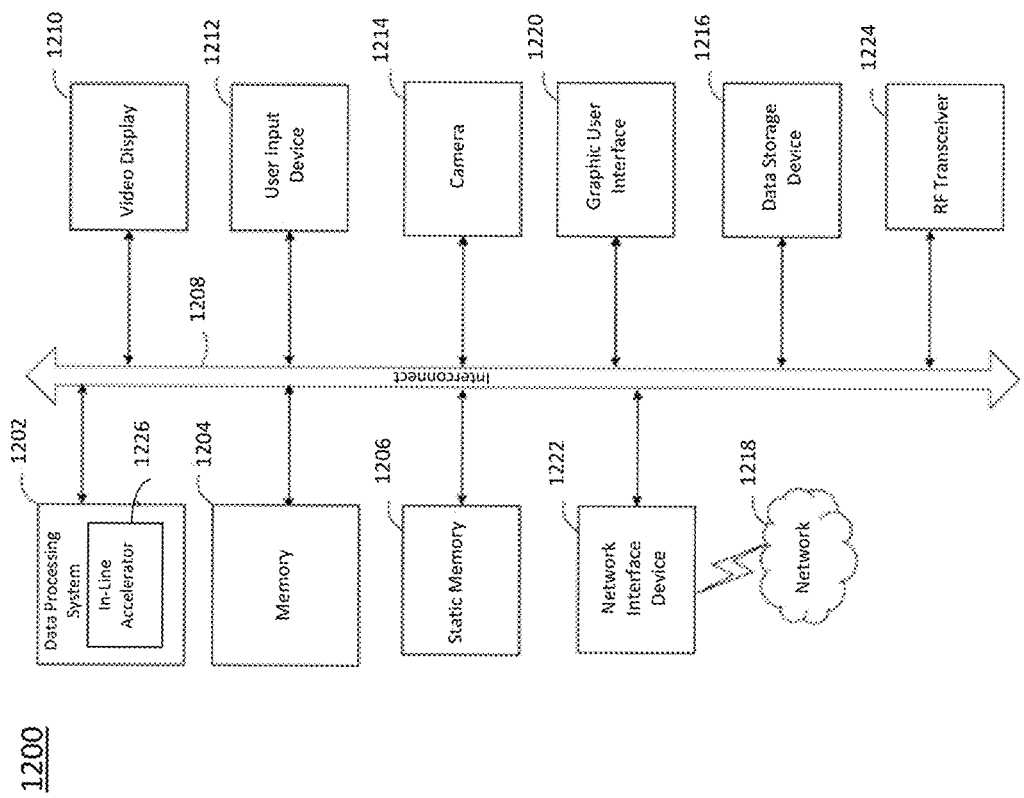
FIG. 12 is a diagram of a computer system including a data processing system according to an embodiment of the invention.

FIG. 12 is a diagram of a computer system including a data processing system according to an embodiment of the invention. Within the computer system 1200 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202, as disclosed above, includes a general purpose instruction-based processor 1227 and an in-line accelerator 1226. The general purpose instruction-based processor may be one or more general purpose instruction-based processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The in-line accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Data processing system 1202 is configured to implement the data processing system for performing the operations and steps discussed herein.

The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement the data storing mechanisms for performing the operations and steps discussed herein.

The computer system 1200 may further include a network interface device 1222. In an alternative embodiment, the data processing system disclose is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), a camera 1214, and a Graphic User Interface (GUI) device 1220 (e.g., a touch-screen with input & output functionality).

The computer system 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202 by the computer system 1200, the main memory 1204 and the data processing system 1202 also constituting machine-readable storage media.

The computer-readable storage medium 1224 may also be used to one or more sets of instructions embodying any one or more of the methodologies or functions described herein. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Embodiments of the invention include a data processing system. The system includes a processing device, an Input/output (I/O) interface to receive incoming data, and an in-line accelerator configured to receive the incoming data from the I/O interface and begin a computation by executing at least a part of operations associated with processing the incoming data. The in-line accelerator is configured to automatically transfer the prematurely terminated computation upon reaching a bailout point from the in-line accelerator to the processing device for execution.

Additional embodiment of invention may include a data processing system wherein the in-line accelerator is configured to accelerate a fast path of execution that is generated by static or dynamic slicing of control and data flow graphs (CDFG) of programs. Additional embodiment of invention may include a data processing system wherein the bailout point and necessary state values are determined at compilation time.

Additional embodiment of invention may include a data processing system wherein the processing device restarts execution of the entire operations associated with processing the incoming data.

Additional embodiment of invention may include a data processing system wherein the processing device continues computation associated with processing the incoming from the bailout point. Additional embodiment of invention may include a data processing system wherein a software-based simulator is used to simulate the in-line accelerator execution from the bailout point. Additional embodiment of invention may include a data processing system wherein upon termination of the execution by the software-based simulator a software-based engine continues the computation natively.

Additional embodiment of invention may include a data processing system wherein the in-line accelerator is implemented on a Field Programmable Gate Array (FPGA).

Embodiments of the invention include a data processing system. The system includes a processing device, at least one in-line accelerator, and a shared memory coupled to the processing device and the at least one in-line accelerator. The at least one in-line accelerator is configured to receive incoming data and execute at least a part of operations associated with processing the incoming data to generate output data elements. The at least one in-line accelerator is configured to store at least part of data state elements with respect to execution of the incoming data in the shared memory. The at least one in-line accelerator is configured to transfer data state elements upon reaching a bailout point from the at least one in-line accelerator to the processing device for execution.

Additional embodiment of invention may include a data processing system wherein the data state elements stored in the shared memory becomes coherent from the processing device side after the bailout point.

Additional embodiment of invention may include a data processing system wherein the in-line accelerator stores data in the shared memory speculatively.

Additional embodiment of invention may include a data processing system further comprising a quasi-speculative cache memory to store the data state elements in a speculative state. In an embodiment, the quasi-speculative cache is configured to delay committing data state elements to non-speculative storages. In an embodiment, the quasi-speculative cache is configured to copy changes to the data state element to the shared memory. In an embodiment, the in-line accelerator is configured to transfer data state elements based on a probability of being read by next operations after the bailout.

Embodiments of the invention include a method of data processing. The method includes receiving incoming data elements by an in-line accelerator for execution, executing at least part of a computation to process incoming data elements before a premature termination, transferring the incoming data elements to a processing device, and processing the incoming data elements by the processing device.

In an additional embodiment the method of data processing includes processing device continues execution of the computation associated with the incoming data elements.

In an additional embodiment the method of data processing includes the processing device restarts the computation associated with processing the incoming data elements.

In an additional embodiment the method of data processing further includes determining whether to continue or restart execution of the computation associated with processing the incoming data elements based on a cost analysis mechanism.

Big data applications can be used for predictive analytics, artificial intelligence, and machine learning to improve efficiency of operations, revenue opportunities, and/or quality of user experience for various businesses. Big data applications however require significant computing power, storage, and network throughput. Consequently, a large amount of hardware resources in terms of servers, networking devices, and storage devices are required to run these applications. These expensive resources are a barrier for using Big data applications.

Big data applications are often described as distributed data flow programs in that data are fed to a pipeline of computational nodes, in which outputs of producer nodes are copied to the inputs of consumer nodes. This creates a large amount of IO traffic, including the traffic from/to storage system and the traffic to/from the network system.

Figure 13:
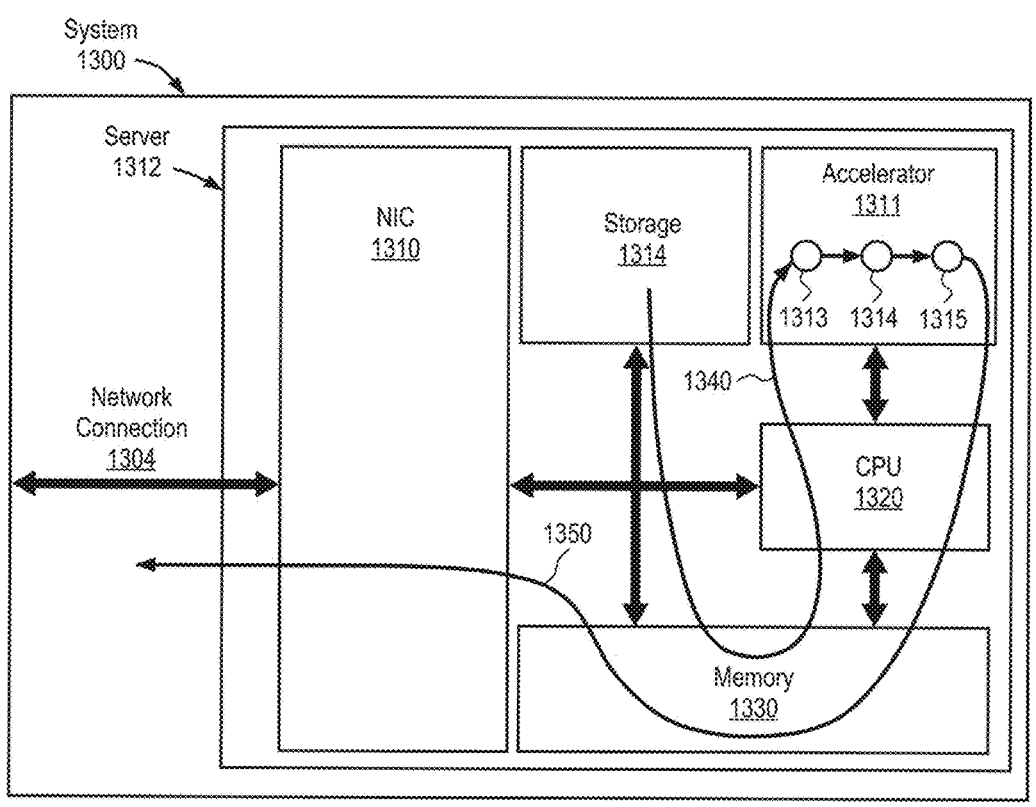
FIG. 13 illustrates a schematic diagram of a data processing system 1300 having an accelerator that is an offload entity.

Conventional general purpose instruction-based processors are not designed for processing large amount of JO traffic. Consequently, there are many expensive movements (e.g., copying of data) when conventional hardware runs Big data applications. FIG. 13 illustrates a schematic diagram of a data processing system 1300 having an accelerator that is an offload entity for a conventional acceleration architecture. The data processing system 1300 includes a network connection 1304 for accessing an I/O processing unit 1310 (network interface card (NIC) 1310) of a server 1312. The NIC 1310 may include features such as interrupt and DMA interfaces to the CPU 1320, support for multiple receive and transmit queues, partitioning into multiple logical interfaces, and on-controller network traffic processing such as the TCP offload engine. The NIC 1310 is directly coupled to storage 1314, CPU 1320, and memory 1330. In one example, the NIC 1310 receives an incoming packet, processes the packet, generates response packet(s), stores the response packet(s) in storage 1314 and memory 1330, processes the response packet(s) with CPU 1320, and then sends the processing packet(s) to accelerator 1311 for additional processing as indicated by data path 1340. The accelerator performs computations 1313-1315 and then sends outgoing packet(s) on a data path 1350 that includes the CPU 1320, memory 1330, NIC 1310, and network connection 1304.

In the example embodiment of FIG. 13, the accelerator 1311 functions as an offload entity rather than an in-line entity. In such a case, the CPU 1320 receives the data (e.g., response packet(s)) and then offloads the computation to the accelerator 1311 and then after the accelerator 1311 completes the computation it returns back the control to the CPU so the CPU can move the result (e.g., outgoing packet(s)) to the network connection 1304 and next stage.

Processing data going from an JO device (storage) to an accelerator, which is not in-line, causes delays. The result from the accelerator is also going to an JO (network) access. Input data to the accelerator first goes through CPU and output data from accelerator also needs to go through the CPU. This causes unnecessary copying from the CPU to the accelerator and then from the accelerator to the CPU and thus causes performance deterioration for the exemplary embodiment of FIG. 13.

This present design provides in-line acceleration to avoid such time consuming operations that cause performance deterioration. This in-line acceleration is done in a completely automated way to provide seamless acceleration and complete autonomy for the users (except the fact that the application is running much faster).

Conventional methods capture data parallelism as well as producer-consumer parallelism in big data/streaming applications using parallel micro-architecture techniques, including multi-cores and multi-threads. These conventional methods also utilize customized hardware with higher energy efficiency and lower areas.

For applications that use external data extensively, IO operations that copy the data to the accelerator and vice versa, become a bottleneck. Consequently, this limits the amount of performance gain achieved from the accelerators.

In machine-learning, big-data, and web engines a large amount of data that is received/sent from/to storage and/or network is processed. Consequently, these applications are amenable to in-line acceleration. Many operations which are essential in these applications require buffering (e.g., checksum calculation, compression, retransmission mechanisms (for reliability), sort algorithms, etc.). In-line acceleration works especially well in conjunction with buffer less computation. Otherwise, the merit of specialization will be limited by the high overhead associated with off-chip memory communications for buffering. The present design utilizes the following techniques to have buffer less and in-line acceleration: use alternative algorithms with minimal/no buffer (e.g., multi-stage sort), use reliable communications (i.e., to avoid buffering and retransmission), use components with minimum throughput guarantees to avoid buffering, use buffering at the end of bulk-synchronous computation models (e.g., Spark). Using above techniques, the present design can have all of the computation stages with maximum throughput and only use the buffers at bulk synchronization points (e.g., communications between first and second servers of a data processing system).

Based on observations, processing in big data applications are mostly done on the data coming from I/O operations, either from a network interface when shuffle operations between different servers occur, or from the storage when data is read from the external storage, or from a stream messaging server. Consequently, if the present design has a first feature that accelerates these big data applications in which the accelerator processes the data coming from input IO without involving the general purpose instruction-based processor, not only does the present design reduce the overhead of copying data from I/O to CPU and vice versa, but the present design also has a second feature of processing data in a much higher throughput than general purpose CPUs.

One important point of these features of the present design is that both of these features are required to gain a higher performance improvement, for accelerating an application.

A Big data application can be translated into a dataflow graph that includes multiple nodes in the graph for many execution engines. An execution platform for a Big data application breaks-down the graph into multiple stages (e.g., map and reduce stages in Hadoop, computation stages in Spark). A cluster of machines is responsible to execute the computation stages. At any given stage, a machine process part of the whole data is distributed in the cluster. Since in a particular stage a machine might require data from other machines (from the previous stage), a shuffle operation happens between the stages. In each shuffle operation, the data from a previous stage is redistributed among the machines. This makes the layout of the data ready for the next stage. In one example, the data can be redistributed among the machines in accordance with at least one system invariant or at least one rule that requires certain data of a first stage to be distributed to a certain machine for a second stage.

Figure 14:
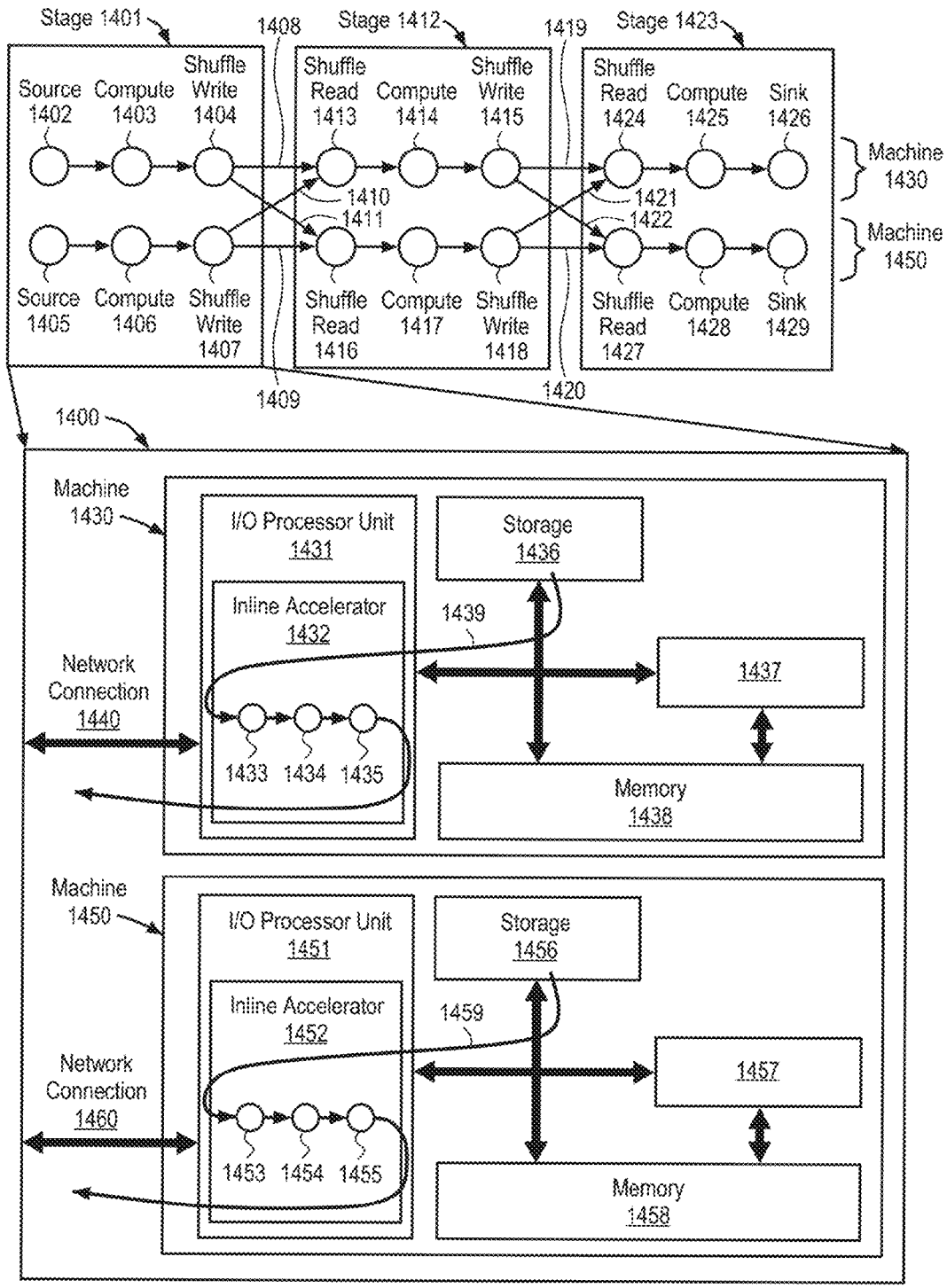
FIGS. 14-16 show an example of big data computation that includes three stages running on multiple machines (e.g., servers) in accordance with one embodiment.
Figure 15:
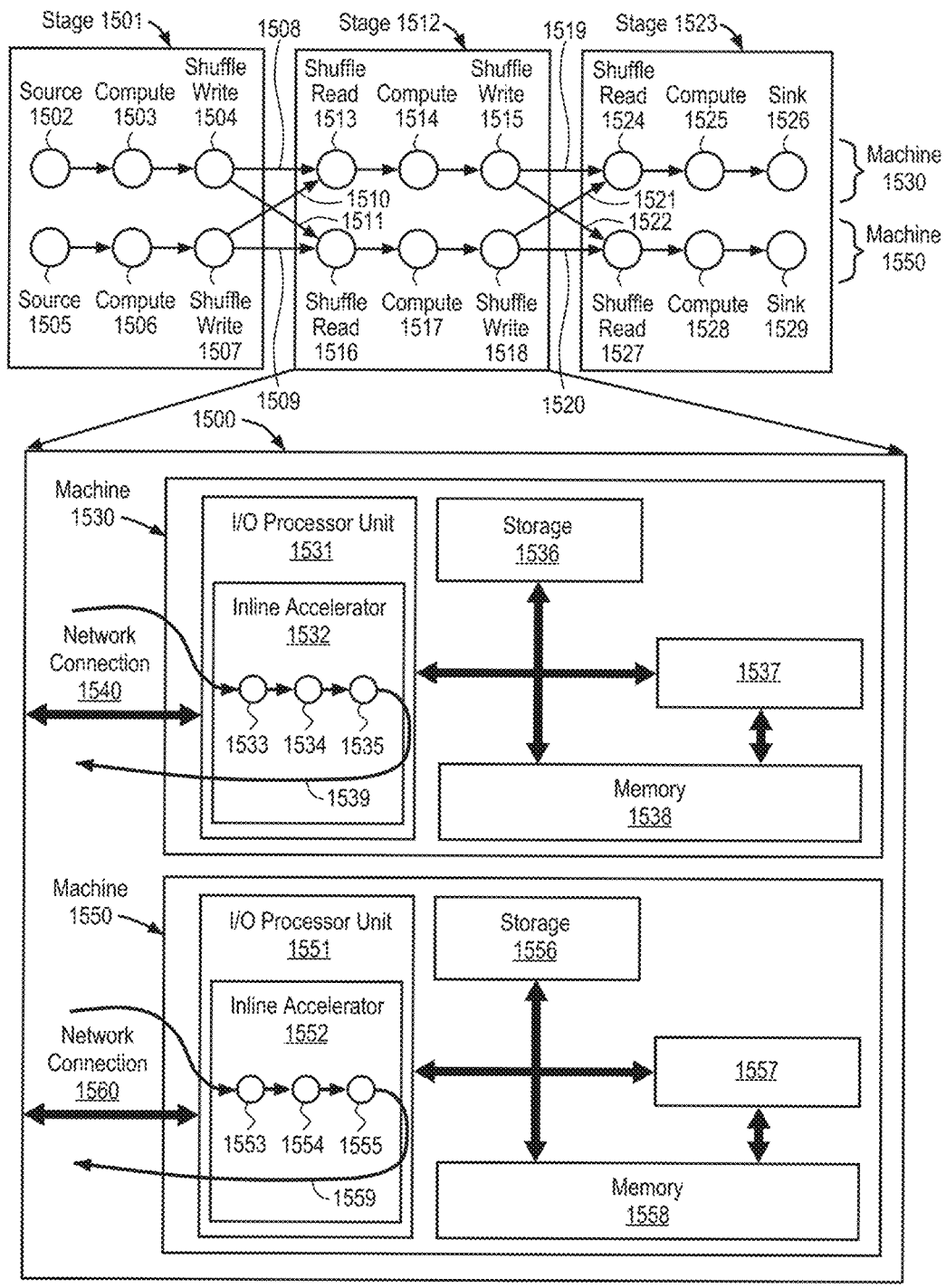
Figure 16:
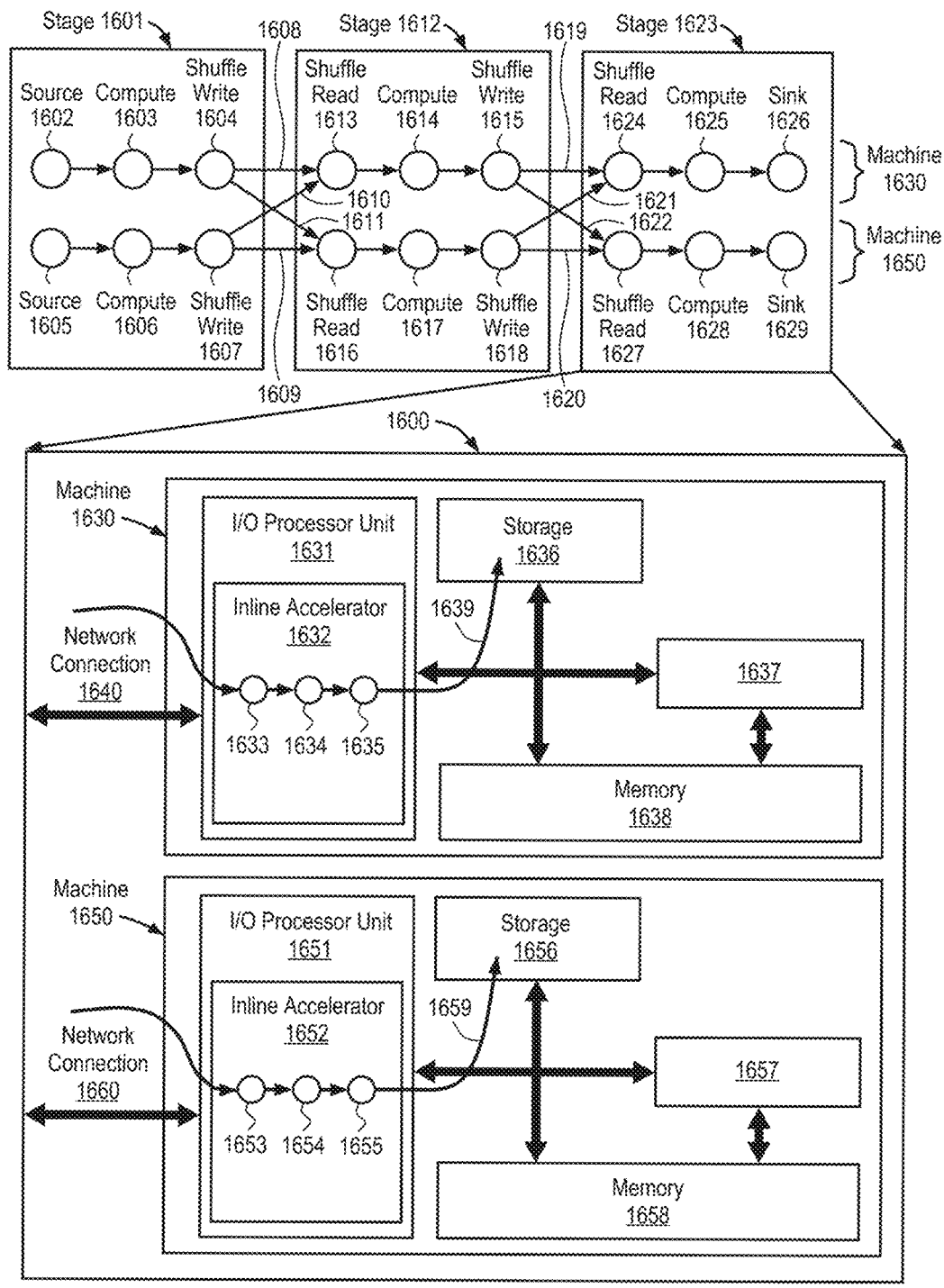

FIGS. 14-16 show an example of big data computation that includes three stages running on multiple servers in accordance with one embodiment. In a first stage 1401 of a data processing system 1400 as illustrated in FIG. 14, the present design reads data from a source storage 1402 and 1405, performs computations 1403 and 1406 on data, and shuffles (e.g., reorganization, aggregation) the data between the computation nodes at shuffle write operations 1404 and 1407 that output 1408-1411 this data to a shuffle read operations 1413 and 1416 of the second stage 1412. The second stage also includes computations 1414 and 1417, shuffle write operations 1415 and 1418, and outputs 1419-1422. Shuffle read operations 1424 and 1427 of the third stage 1423 receive the outputs, computations 1425 and 1428 are performed, and results are written into sink storage 1426 and 1429. A machine 1430 (e.g., server 1430) performs the operations 1402-1404, 1413-1415, and 1424-1426. The server 1430 includes an I/O processing unit 1431 (e.g., network interface card 1431) having an in-line accelerator 1432. The server 1430 also includes storage 1436, general purpose instruction-based processor 1437, and memory 1438. A data path 1439 illustrates the data flow for server 1430 for stage 1401. For example, data is read from a source storage 1402 of storage 1436 (e.g., operation 1433) and computations 1403 (e.g., operation 1434) and shuffle write operations 1404 (e.g., operation 1435) are performed by the in-line accelerator 1432. The outputs 1408 and 1411 are sent to a second stage 1412 via a network connection 1440.

A machine 1450 (e.g., server 1450) performs the operations 1405-1407, 1416-1418, and 1427-1429. The server 1450 includes an I/O processing unit 1451 (e.g., network interface card 1451) having an in-line accelerator 1452. The server 1450 also includes storage 1456, general purpose instruction-based processor 1457, and memory 1458. The server 1450 also includes storage 1456, general purpose instruction-based processor 1457, and memory 1458. A data path 1459 illustrates the data flow for server 1450 for stage 1401. For example, data is read from a source storage 1405 of storage 1456 (e.g., operation 1453), computations 1406 (e.g., operation 1454) and shuffle write operations 1407 (e.g., operation 1455) are performed by the in-line accelerator 1452. The outputs 1409-1410 are sent to a second stage 1412 via a network connection 1460.

FIG. 15 illustrates a second stage of a data processing system in accordance with one embodiment. The stages 1501, 1512, and 1523 may correspond to the stages 1401, 1412, and 1423, respectively of FIG. 14. The operations 1502-1507, 1513-1518, 1524-1529 of the stages of FIG. 15 may correspond to the operations 1402-1407, 1413-1418, and 1424-1429, respectively of FIG. 14. For the present design in the second stage 1512, the result of shuffled data is gathered from the previous stage at shuffle read operations 1513 and 1516. Another computation is done on the data at operations 1514 and 1517, and another shuffle 1515 and 1518 happens on the result of the computation.

A machine 1530 (e.g., server 1530) performs the operations 1502-1504, 1513-1515, and 1524-1526. The server 1530 includes an I/O processing unit 1531 (e.g., network interface card 1531) having an in-line accelerator 1532. The server 1530 also includes storage 1536, general purpose instruction-based processor 1537, and memory 1538. A data path 1539 illustrates the data flow for server 1530 for stage 1512. For example, the result of shuffled data is gathered from the previous stage at shuffle read operation 1513 (e.g., operation 1533), computation 1514 (e.g., operation 1534) and shuffle write operation 1515 (e.g., operation 1535) are performed by the in-line accelerator 1532. The outputs 1519 and 1522 are sent to a third stage 1523 via a network connection 1540.

A machine 1550 (e.g., server 1550) performs the operations 1505-1507, 1516-1518, and 1527-1529. The server 1550 includes an I/O processing unit 1551 (e.g., network interface card 1551) having an in-line accelerator 1552. The server 1550 also includes storage 1556, general purpose instruction-based processor 1557, and memory 1558. A data path 1559 illustrates the data flow for server 1550 for stage 1512. For example, the result of shuffled data is gathered from the previous stage at shuffle read operation 1516 (e.g., operation 1553), computation 1517 (e.g., operation 1554) and shuffle write operation 1518 (e.g., operation 1585) are performed by the in-line accelerator 1552. The outputs 1520-1521 are sent to a third stage 1523 via a network connection 1540.

FIG. 16 illustrates a third stage of a data processing system in accordance with one embodiment. The stages 1601, 1612, and 1623 may correspond to the stages 1501, 1512, and 1523, respectively of FIG. 15 and also may correspond to the stages 1401, 1412, and 1423, respectively of FIG. 14. The operations 1602-1607, 1613-1618, 1624-1629 of the stages of FIG. 16 may correspond to the operations 1502-1507, 1513-1518, 1524-1529, respectively of the stages of FIG. 15 and also may correspond to the operations 1402-1407, 1413-1418, and 1424-1429, respectively of FIG. 14. For the present design in the third stage 1623, the result of a second shuffle is collected at shuffle read operations 1624 and 1627 and after another computation 1625 and 1628, the result is written into a sink storage, the final storage of the data in memory or file system at operations 1626 and 1629 upon completion of the third stage (e.g., upon completion of a Hadoop or Spark job).

A machine 1630 (e.g., server 1630) performs the operations 1602-1604, 1613-1615, and 1624-1626. The server 1630 includes an I/O processing unit 1631 (e.g., network interface card 1631) having an in-line accelerator 1632. The server 1630 also includes storage 1636, general purpose instruction-based processor 1637, and memory 1638. A data path 1659 illustrates the data flow for server 1630 for stage 1623. For example, the result of shuffled data is gathered from the previous stage at shuffle read operation 1624 (e.g., operation 1633), computation 1625 (e.g., operation 1634) is performed by the in-line accelerator 1632, and the result is written into a sink storage 1636 or final storage of the data in memory or file system (e.g., operation 1635).

A machine 1650 (e.g., server 1650) performs the operations 1605-1607, 1616-1618, and 1627-1629. The server 1650 includes an I/O processing unit 1651 (e.g., network interface card 1651) having an in-line accelerator 1652. The server 1650 also includes storage 1656, general purpose instruction-based processor 1657, and memory 1658. A data path 1659 illustrates the data flow for server 1650 for stage 1623. For example, the result of shuffled data is gathered from the previous stage at shuffle read operation 1627 (e.g., operation 1653), computation 1628 (e.g., operation 1654) is performed by the in-line accelerator 1652, and the result is written into a sink storage 1656 or final storage of the data in memory or file system (e.g., operation 1655).

In an embodiment, I/O processing unit (e.g., 1431, 1451, 1531, 1551, 1631, 1651) may be Network Interface Card (NIC). In an embodiment of the invention, the in-line accelerator is part of the NIC. In an embodiment, the NIC is on the same chip as the general purpose instruction-based processor (e.g., 1437, 1457, 1537, 1557, 1637, 1657) 120. In an alternative embodiment, the NIC is on a separate chip coupled to the general purpose instruction-based processor.

In these data paths for three stages, data is coming from an I/O component then sent to another I/O device. Although this is not always the case, in most scenarios at the end of each stage, the result is first buffered in temporary memory and/or storage and the subsequent next stage pulls the data from this temporary memory and/or storage. Based on our observation, the in-line accelerator performs the compute phase on the incoming data immediately after receiving it from network or storage.

In order to do the above, the present design automatically compiles the computations associated with each stage in an in-line accelerator, which has (i) direct access to a network and storage and (ii) higher performance using specialization and parallelization techniques. The present design eliminates extra copying of data between I/O components and a CPU. The present design also improves the processing throughput beyond the performance of conventional CPUs for I/O intensive applications. The present design is structurally unique in utilizing an in-line accelerator in big data servers. The present design is functional unique based on having a compiler that generates in-line accelerators or automatically compiles code into an in-line accelerator from computation stages.

In an embodiment, in-line accelerators as discussed herein may be implemented using any device known to be used as accelerator, including but not limited to field-programmable gate array (FPGA), Coarse-Grained Reconfigurable Architecture(CGRA), general-purpose computing on graphics processing unit (GPGPU), many light-weight cores (MLWC), network general purpose instruction-based processor, I/O general purpose instruction-based processor, many-cores, DSPs, and application-specific integrated circuit (ASIC).

Figure 17:
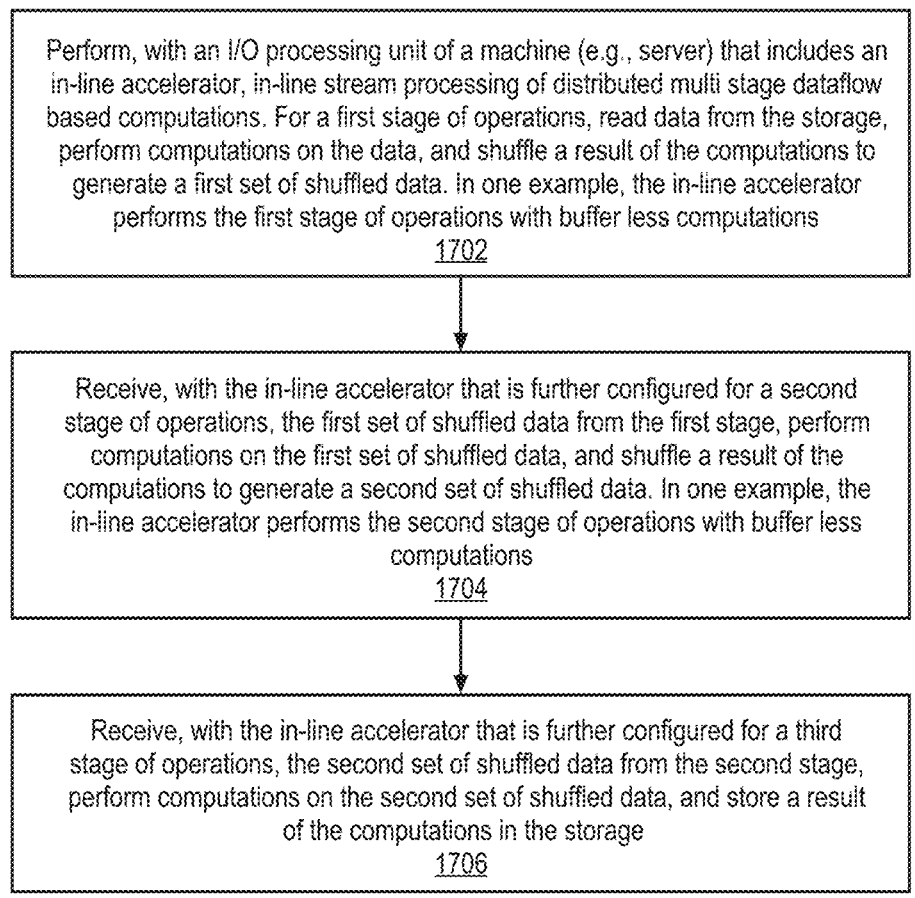
FIG. 17 is a flowchart illustrating a method 1700 for in-line stream processing of distributed multi stage dataflow based computations according to an embodiment of the disclosure.

FIG. 17 is a flow diagram illustrating a method 1700 for in-line stream processing of distributed multi stage dataflow based computations according to an embodiment of the disclosure. Although the operations in the method 1700 are shown in a particular order, the order of the actions can be modified. Thus, the illustrated embodiments can be performed in a different order, and some operations may be performed in parallel. Some of the operations listed in FIG. 17 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of method 1700 may be executed by a data processing system, a machine, a server, a web appliance, or any system, which includes an in-line accelerator. The in-line accelerator may include hardware (circuitry, dedicated logic, etc.), software (such as is run on a general purpose computer system or a dedicated machine or a device), or a combination of both. In one embodiment, an in-line accelerator performs the operations of method 1700.

At operation 1702, the method includes performing in-line stream processing of distributed multi stage dataflow based computations with an I/O processing unit of a machine (e.g., server) having an in-line accelerator that is configured for a first stage of operations to read data from the storage, to perform computations on the data, and to shuffle a result of the computations to generate a first set of shuffled data. In one example, the in-line accelerator performs the first stage of operations with buffer less computations. At operation 1704, the method further includes receiving, with the in-line accelerator that is further configured for a second stage of operations, the first set of shuffled data from the first stage, performing computations on the first set of shuffled data, and shuffling a result of the computations to generate a second set of shuffled data. In one example, the in-line accelerator performs the second stage of operations with buffer less computations. At operation 1706, the method further includes receiving, with the in-line accelerator that is further configured for a third stage of operations, the second set of shuffled data from the second stage, performing computations on the second set of shuffled data, and storing a result of the computations in the storage. In one embodiment, the machine includes a general purpose instruction-based processor that is coupled to an I/O processing unit. The in-line accelerator is configured to perform the operations of the first stage, the second stage, and the third stage without utilizing the general purpose instruction-based processor.

The invention claimed is:

1. A machine comprising:
storage to store data; and
an Input/output (I/O) processing unit coupled to the storage, the I/O processing unit having an in-line accelerator that is configured for in-line stream processing of distributed multi stage dataflow based computations including for a first stage of operations to read data from the storage and to perform computations on the data with buffer less computations, wherein the in-line accelerator is further configured to shuffle a result of the computations to generate a first set of shuffled data, wherein the in-line accelerator is further configured for a second stage of operations to receive the first set of shuffled data from the first stage, to perform computations on the first set of shuffled data, and to shuffle a result of the computations to generate a second set of shuffled data.

2. The method of claim 1, wherein a compiler automatically compiles code into the in-line accelerator for computations.

3. The machine of claim 2, wherein the in-line accelerator performs the second stage of operations with buffer less computations.

4. The machine of claim 2, wherein the in-line accelerator is further configured for a third stage of operations to receive the second set of shuffled data from the second stage, to perform computations on the second set of shuffled data, and to store a result of the computations in the storage.

5. The machine of claim 1, further comprising:
a general purpose instruction-based processor coupled to the I/O processing unit, wherein the in-line accelerator is configured to perform the operations of the first stage, the second stage, and the third stage without utilizing the general purpose instruction-based processor.

6. The machine of claim 1, wherein the in-line accelerator is implemented on a Field Programmable Gate Array (FPGA), a many-core, a graphical processing unit (GPU), or an application specific integrated circuit (ASIC).

7. A data processing system comprising:
a first server having a network connection, storage to store data, and a first Input/output (I/O) processing unit having a first in-line accelerator that is configured for in-line stream processing of distributed multi stage dataflow based computations including for a first stage of operations to read data from the storage, to perform computations on the data, and to shuffle a result of the computations to generate a first set of shuffled data; and
a second server coupled to the first server, a second server having a network connection, storage to store data, and a second Input/output (I/O) processing unit having a second in-line accelerator that is configured for in-line stream processing of distributed multi stage dataflow based computations including for the first stage of operations to read data from the storage, to perform computations on the data, and to shuffle a result of the computations to generate a second set of shuffled data.

8. The data processing system of claim 7, wherein the first and second in-line accelerators perform the first stage of operations with buffer less computations.

9. The data processing system of claim 8, wherein the first in-line accelerator is further configured for a second stage of operations to receive the first and second sets of shuffled data from the first stage, to perform computations on the first and second sets of shuffled data, and to shuffle a result of the computations to generate a third set of shuffled data.

10. The data processing system of claim 9, wherein the second in-line accelerator is further configured for the second stage of operations to receive the first and second sets of shuffled data from the first stage, to perform computations on the first and second sets of shuffled data, and to shuffle a result of the computations to generate a fourth set of shuffled data.

11. The data processing system of claim 10, wherein the first and second in-line accelerators perform the second stage of operations with buffer less computations.

12. The data processing system of claim 11, wherein the first in-line accelerator is further configured for a third stage of operations to receive the third and fourth set of shuffled data from the second stage, to perform computations on the third and fourth sets of shuffled data, and to store a result of the computations in the storage.

13. The data processing system of claim 12, wherein the second in-line accelerator is further configured for the third stage of operations to receive the third and fourth sets of shuffled data from the second stage, to perform computations on the third and fourth sets of shuffled data, and to store a result of the computations in the storage.

14. The data processing system of claim 7, wherein the first server further comprising:
a first general purpose instruction-based processor coupled to the first I/O processing unit, wherein the first in-line accelerator is configured to perform the operations of the first stage, the second stage, and the third stage without utilizing the first general purpose instruction-based processor.

15. The data processing system of claim 7, wherein the second server further comprising:
a second general purpose instruction-based processor coupled to the second I/O processing unit, wherein the second in-line accelerator is configured to perform the operations of the first stage, the second stage, and the third stage without utilizing the second general purpose instruction-based processor.

16. The data processing system of claim 7, wherein the first and second in-line accelerators are each implemented on a Field Programmable Gate Array (FPGA).

17. A computer-implemented method comprising:
performing in-line stream processing of distributed multi stage dataflow based computations with an input/output (I/O) processing unit of a machine having an in-line accelerator that is configured for a first stage of operations to read data from a storage of the machine, to perform computations on the data, and to shuffle a result of the computations to generate a first set of shuffled data;
receiving, with the in-line accelerator for a second stage of operations, the first set of shuffled data from the first stage;
performing computations on the first set of shuffled data; and
shuffling a result of the computations to generate a second set of shuffled data, wherein the in-line accelerator performs the first stage of operations with buffer less computations.

18. The computer-implemented method of claim 17, wherein the in-line accelerator performs the second stage of operations with buffer less computations.

19. The computer-implemented method of claim 18, further comprising: receiving, with the in-line accelerator for a third stage of operations, the second set of shuffled data from the second stage;
performing computations on the second set of shuffled data; and
storing a result of the computations in the storage.

* * * * *